(12) United States Patent
Fukui et al.

(10) Patent No.: US 12,370,954 B2
(45) Date of Patent: Jul. 29, 2025

(54) CONSOLE BOX

(71) Applicant: TOYODA GOSEI CO., LTD., Kiyosu (JP)

(72) Inventors: Naoyuki Fukui, Kiyosu (JP); Yu Hishida, Kiyosu (JP); Etsuo Ozawa, Kiyosu (JP); Tasuku Shimizu, Nisshin (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 242 days.

(21) Appl. No.: 17/976,169

(22) Filed: Oct. 28, 2022

(65) Prior Publication Data

US 2023/0136714 A1    May 4, 2023

(30) Foreign Application Priority Data

Nov. 4, 2021 (JP) .................................. 2021-180399
Jul. 20, 2022 (JP) .................................. 2022-115710

(51) Int. Cl.
*B60R 7/04* (2006.01)

(52) U.S. Cl.
CPC ...................... *B60R 7/04* (2013.01)

(58) Field of Classification Search
CPC .. B60N 2/79; B60R 7/04; B60R 7/043; B60R 7/06; B60R 13/013; B60R 2013/015; B60R 2011/0014; E05B 83/32; E05C 19/12
USPC .......................................... 296/24.34, 24.46
See application file for complete search history.

(56) References Cited

U.S. PATENT DOCUMENTS

| 5,067,625 | A | * | 11/1991 | Numata | A45C 11/24 220/230 |
| 5,195,272 | A | | 3/1993 | Yamada | |
| 5,357,652 | A | * | 10/1994 | Yamada | B60R 7/04 49/193 |
| 9,140,044 | B2 | * | 9/2015 | Singh | E05D 15/502 |
| 10,526,830 | B2 | * | 1/2020 | Ike | E05D 15/502 |
| 2008/0197648 | A1 | * | 8/2008 | Smith | B60R 7/04 296/24.34 |
| 2018/0022281 | A1 | * | 1/2018 | Hatakeyama | E05D 15/50 220/811 |

(Continued)

FOREIGN PATENT DOCUMENTS

| JP | S6210152 U | 1/1987 |
| JP | 2002038811 A | 2/2002 |

(Continued)

OTHER PUBLICATIONS

Japanese Office Action dated May 27, 2025 issued in corresponding Japanese Patent Application No. 2022-115710 (and English machine translation).

*Primary Examiner* — Joseph D. Pape
(74) *Attorney, Agent, or Firm* — Posz Law Group, PLC

(57) ABSTRACT

A console box includes a box main body having an upper opening, and a lid that opens and closes the upper opening. The lid includes a lid main body, a pivot, and an operation portion. The pivot is provided at one side in a width direction of the lid main body and couples the lid main body to the box main body. The operation portion is provided to correspond to the pivot, and decouples the pivot and the box main body from each other when operated. The lid is configured to be pivotal about the pivot and to be detached from the box main body when the operation portion is operated.

10 Claims, 17 Drawing Sheets

(56) References Cited

U.S. PATENT DOCUMENTS

| | | | |
|---|---|---|---|
| 2018/0086514 A1* | 3/2018 | Hishida | B65D 43/16 |
| 2020/0156552 A1* | 5/2020 | Yoshida | B60N 2/793 |
| 2023/0014176 A1* | 1/2023 | Izume | B60R 7/04 |

FOREIGN PATENT DOCUMENTS

| | | |
|---|---|---|
| JP | 2009214780 A | 9/2009 |
| JP | 2020-082926 A | 6/2020 |

* cited by examiner

CONSOLE BOX

BACKGROUND

1. Field

The present disclosure relates to a console box.

2. Description of Related Art

Japanese Laid-Open Patent Publication No. 2020-82926 discloses a console box provided in a passenger compartment of a vehicle.

The console box disclosed in the publication includes a box main body and a lid. The box main body includes an accommodation portion having an upper opening. The lid is supported by the box main body so as to be pivotal. The lid performs opening/closing action between a closed state, in which the upper opening is closed, and an open state, in which the upper opening is open. The console box includes an opening-closing mechanism. The opening-closing mechanism includes a left-side pivot, which extends in the front-rear direction along the left-side edge of the opening, and a right-side pivot, which extends in the front-rear direction along the right-side edge of the opening. The opening-closing mechanism opens or closes the lid about a selected one of the left-side pivot and the right-side pivot.

The opening-closing mechanism includes a right-side operation portion and a left-side operation portion. The right-side operation portion is attached to the main body of the lid, and the left-side operation portion is attached to the main body of the lid. When subjected to an opening operation, the right-side operation portion opens the lid about the left-side pivot. When subjected to an opening operation, the left-side operation portion opens the lid about the right-side pivot.

The opening-closing mechanism includes an erroneous operation preventing device that prevents simultaneous execution of the opening operation of the lid by the right-side operation portion and the opening operation of the lid by the left-side operation portion. The erroneous operation preventing device prevents an opening operation by the left-side operation portion from being performed, that is, prevents the right-side pivot from being dislocated, during an opening operation of the lid about the left-side pivot through opening operation by the right-side operation portion.

The console box that includes the structure disclosed in Japanese Laid-Open Patent Publication No. 2020-82926 includes the erroneous operation preventing device. This complicates the structure and increases the number of components. The weight of the console box increases, accordingly.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a console box includes a box main body and a lid. The box main body includes an upper opening. The lid is pivotally coupled to the box main body, and opens and closes the upper opening. The lid includes a lid main body, a pivot, and an operation portion. The pivot is provided at one side in a width direction of the lid main body. The pivot couples the lid main body to the box main body. The operation portion is provided to correspond to the pivot. The operation portion decouples the pivot and the box main body from each other when operated. The lid is configured to be pivotal about the pivot and to be detached from the box main body when the operation portion is operated.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

A console box according to one embodiment will now be described with reference to FIGS. 1 to 9.

Figure 1:
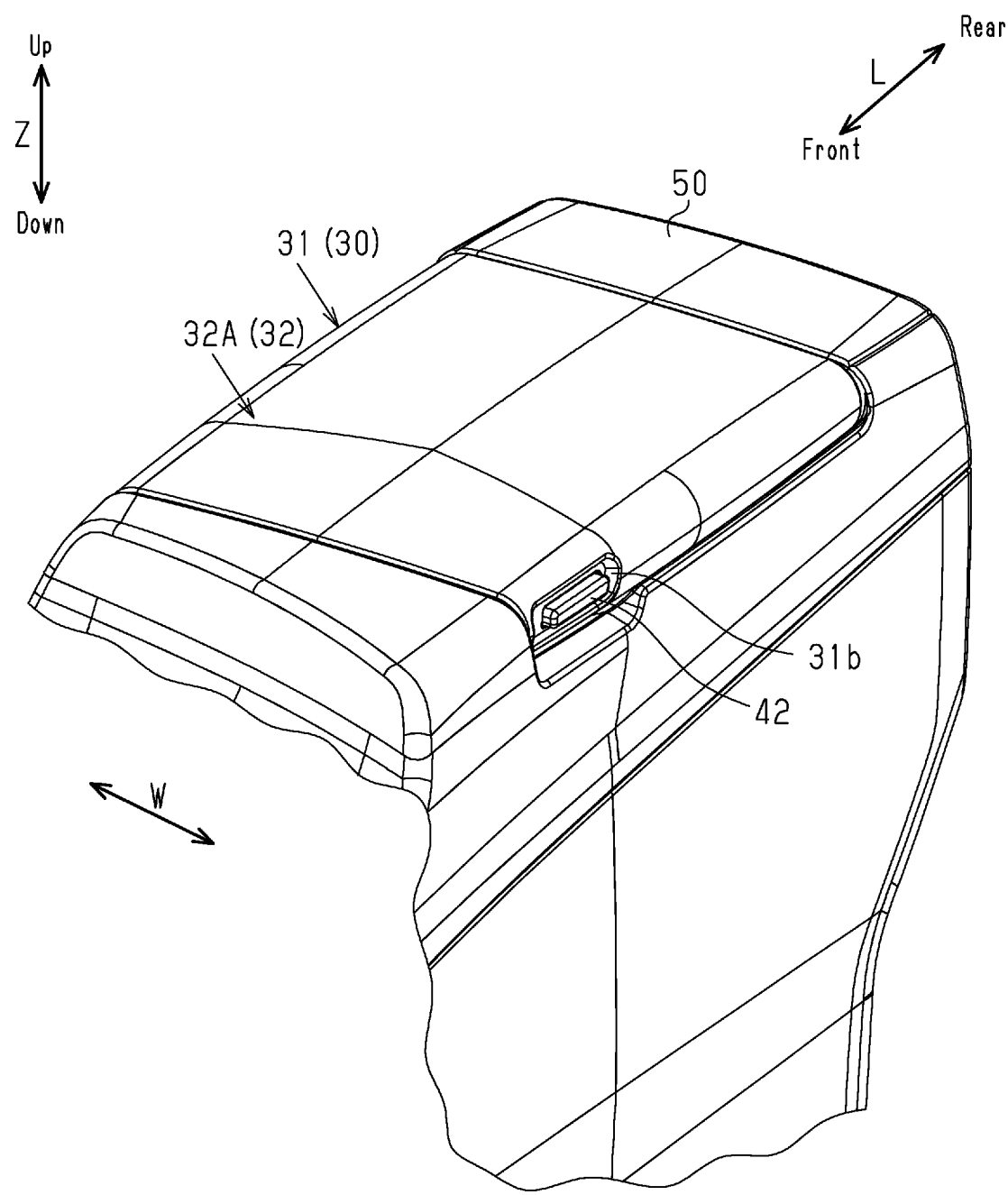
FIG. 1 is a perspective view of a console box according to a first embodiment.

As shown in FIG. 1, the console box is located between the driver's seat and the front passenger seat in a passenger compartment.

In the following description, the front-rear direction of the vehicle will be simply referred to as a front-rear direction L. The side farther from the center of the vehicle in a vehicle width direction W will be referred to as an outer side in the vehicle width direction W, and the side closer to the center will be referred to as an inner side in the vehicle width direction W. The up-down direction of the vehicle when the vehicle is on a horizontal plane will be simply referred to as an up-down direction Z.

Figure 2:
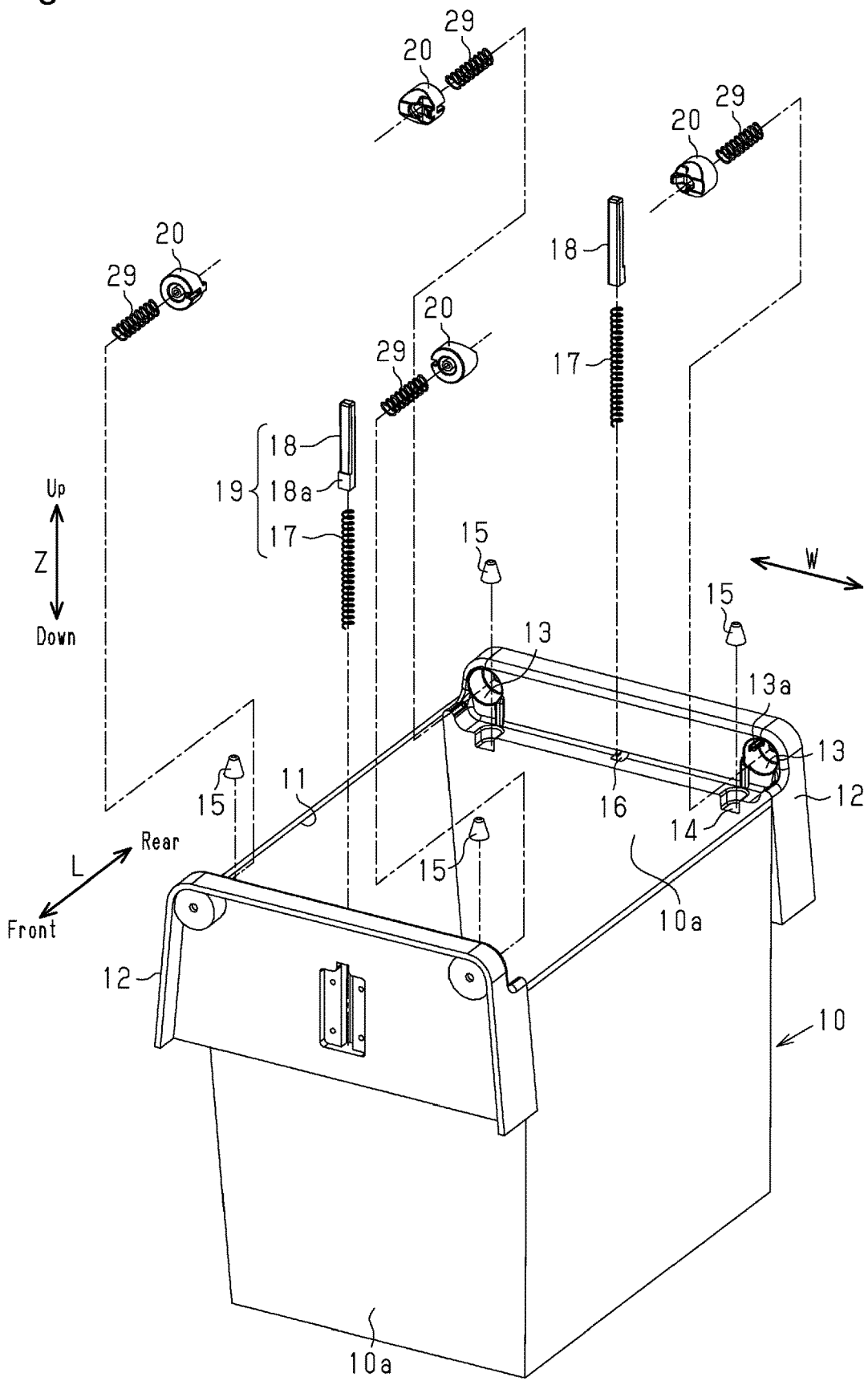
FIG. 2 is an exploded perspective view of a box main body according to the first embodiment.

As shown in FIG. 2, the console box includes a box main body 10, which includes an upper opening 11.

Figure 3:
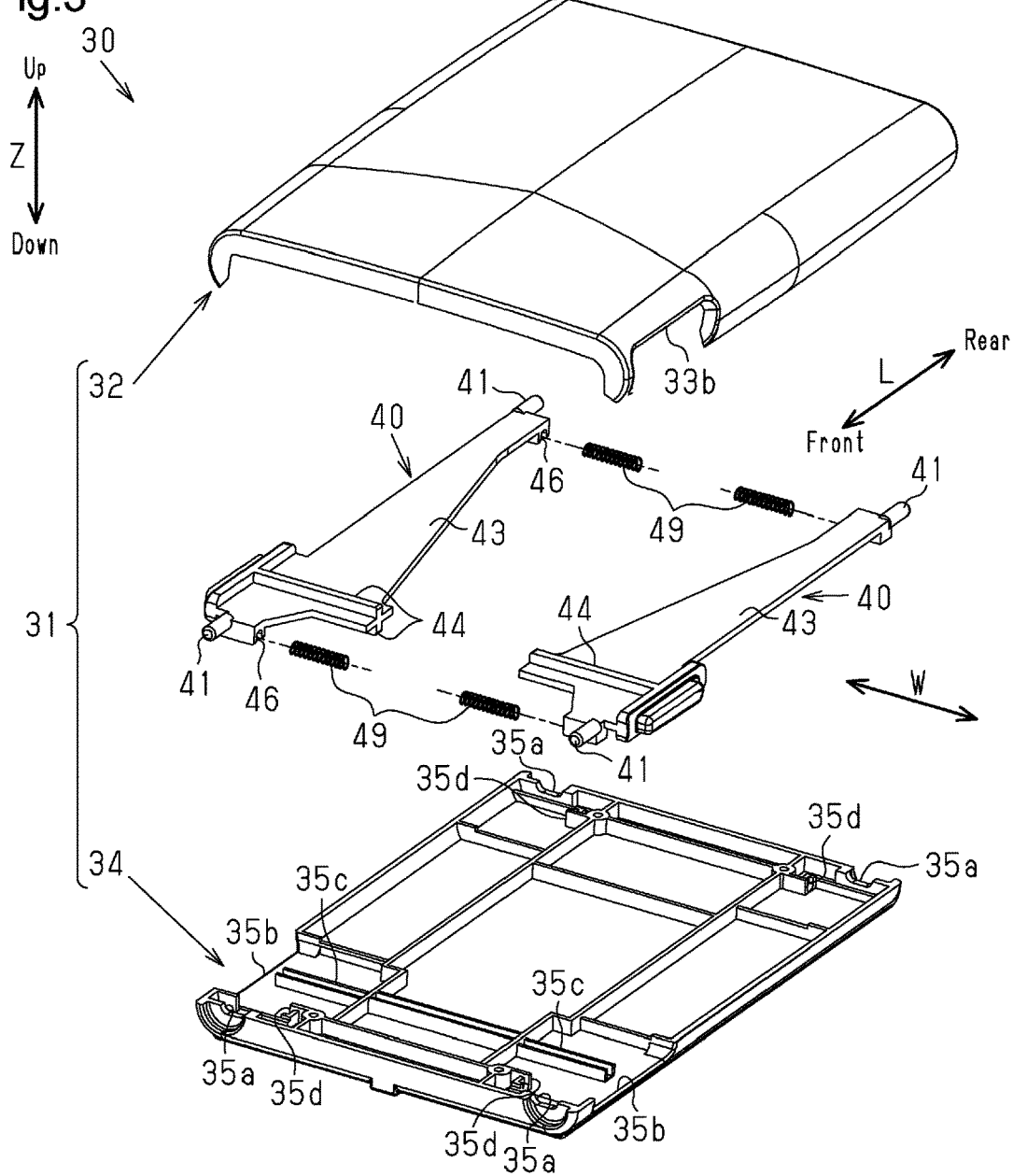
FIG. 3 is an exploded perspective view of a lid according to the first embodiment.

As shown in FIG. 3, the console box includes a lid 30, which is pivotally coupled to the box main body 10 to open and close the upper opening 11.

As shown in FIGS. 2 and 3, a lid main body 31 is coupled to the box main body 10 by two pivots 41 and shims 20. Each pivot 41 includes a pair of front and rear shafts. The two pivots 41 are arranged to be parallel with each other at the opposite sides in the vehicle width direction W of the lid main body 31.

As shown in FIGS. 1 and 3, the lid 30 includes two independent operation portions 42, each of which corresponds to one of the pivots 41. When pushed into the lid main body 31, each operation portion 42 decouples the corresponding pivot 41 and the box main body 10 from each other.

The lid 30 is configured to pivot about an axis C of a selected one of the pivots 41. The lid 30 is also configured to be detached from the box main body 10 when both of the operation portions 42 are operated simultaneously.

As shown in FIG. 1, the console box includes a housing 50, which accommodates the box main body 10 with an upper surface of the lid 30 exposed.

The components of the console box will now be described.

<Box Main Body 10>

As shown in FIG. 2, the box main body 10 has a substantially rectangular parallelepiped shape.

The upper opening 11 has a substantially rectangular shape in a plan view. The upper opening 11 has two edges extending in the front-rear direction L and two edges extending in the vehicle width direction W.

The box main body 10 has a symmetrical structure with respect to the front-rear direction L and also has a symmetrical structure with respect to the vehicle width direction W. Therefore, in the following description, the structure of one side in the front-rear direction L of the box main body 10 will be described while omitting the explanation of the other side in some cases. Also, the structure of one side in the vehicle width direction W of the box main body 10 will be described while omitting the explanation of the other side in some cases.

The box main body 10 includes front and rear side walls 10a, each of which is provided with a supporting portion 12.

The front supporting portion 12 is located forward of the upper opening 11. The rear supporting portion 12 is located rearward of the upper opening 11. The supporting portions 12 project upward and downward with respect to the upper opening 11.

Each supporting portion 12 includes shim receiving recesses 13 in a surface facing the upper opening 11 in the front-rear direction L. The shim receiving recesses 13 are provided at the opposite sides of the supporting portion 12 in the vehicle width direction W. The internal space of each shim receiving recess 13 has a columnar shape with its axis extending in the front-rear direction L. A locking projection 13a, which is elongated in the front-rear direction L, is provided on the inner circumferential surface of the shim receiving recess 13.

Each shim receiving recess 13 receives a shim 20, which will be discussed below.

Each side wall 10a includes cushion receiving recesses 14 in the upper end face. The cushion receiving recesses 14 are provided at the opposite sides of the side wall 10a in the vehicle width direction W.

Figure 7:
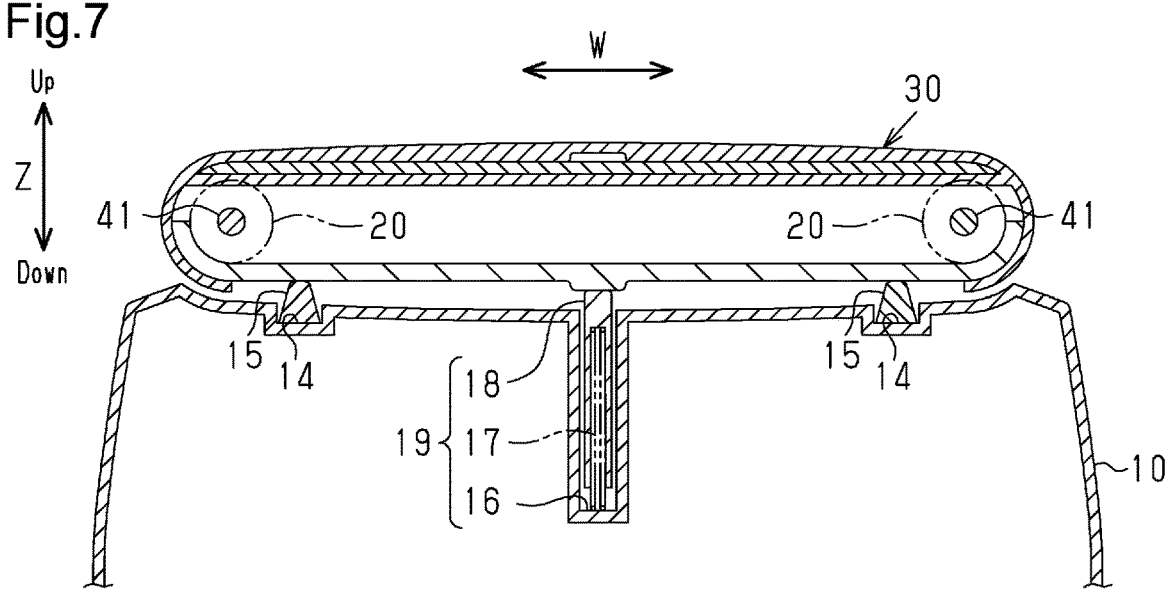
FIG. 7 is a cross-sectional view taken along line 7-7 of FIG. 5.

As shown in FIG. 7, each cushion receiving recess 14 receives a cushion 15 substantially having a shape of a truncated cone. The lower surface of the cushion 15 is fixed to the bottom surface of the cushion receiving recess 14. The upper end of the cushion 15 protrudes further upward than sections of the upper end face of the side wall 10a that are adjacent to the cushion receiving recess 14.

As shown in FIG. 2, a spring receiving hole 16, which extends in the up-down direction Z, opens in the upper end face of each side wall 10a. The spring receiving hole 16 is provided at a center, in the vehicle width direction W, of the side wall 10a.

As shown in FIG. 7, the spring receiving hole 16 accommodates a lifting member 18, which extends in the up-down direction Z. The lifting member 18 has a hollow structure with a downward opening. A spring 17 is provided in a compressed state between the lifting member 18 and the bottom surface of the spring receiving hole 16. The spring 17 always urges the lifting member 18 upward. The upper end face of the lifting member 18 is in contact with the lower surface of the lid 30. The lid 30 is always urged upward by the lifting members 18.

As shown in FIG. 2, the measurement in the front-rear direction L of a lower end 18a of the lifting member 18 is larger than the measurements in the front-rear direction L of the upper portion of the lifting member 18 and the upper opening of the spring receiving hole 16. The lower end 18a contacts the edge of the upper opening of the spring receiving hole 16 so that the lifting member 18 is prevented from being dislodged upward from the spring receiving hole 16.

The spring receiving hole 16, the spring 17, and the lifting member 18 form a lifting mechanism 19, which always urges the lid 30 upward.

<Lid 30>

As shown in FIG. 3, the lid 30 includes the lid main body 31, functional members 40, and first springs 49.

The lid 30 in a closed state will now be described.

The lid main body 31 extends in the front-rear direction L and in the vehicle width direction W. In the present embodiment, the width direction of the lid main body 31 agrees with the vehicle width direction W. Accordingly, the description will be made assuming that the width direction of the lid main body 31 agrees with the width direction W in some cases.

Structure 1 of Lid Main Body 31

The lid main body 31 includes two vertically separated components: a first half body 32 and a second half body 34.

Figure 8A:
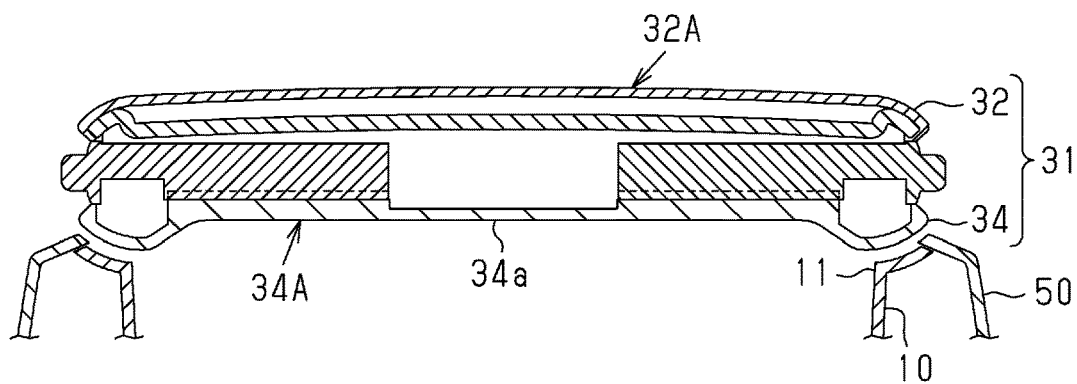
FIG. 8A is a cross-sectional view taken along line 8-8 of FIG. 5.

As shown in FIGS. 1 and 8A, the first half body 32 includes a first surface 32A of the lid main body 31. The first surface 32A includes an armrest surface. In the present embodiment, the entire first surface 32A forms an armrest surface.

Figure 8B:
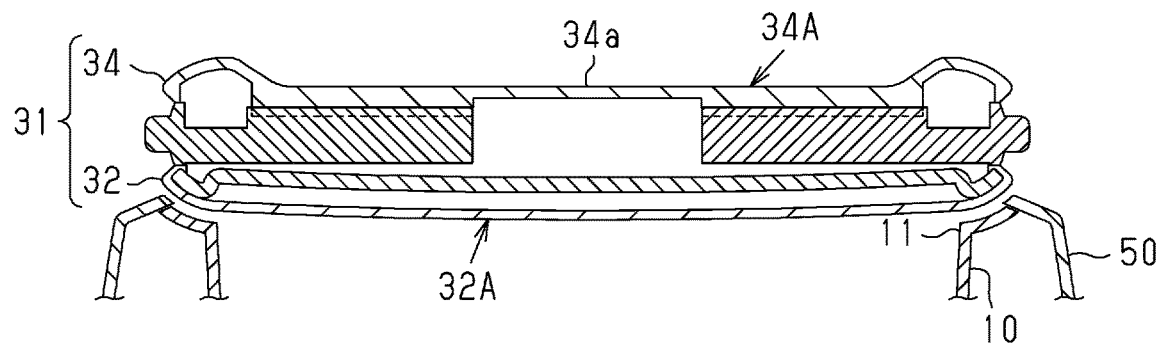
FIG. 8B is a cross-sectional view corresponding to FIG. 8A, illustrating a state in which a second surface of the lid is facing upward.
Figure 9:
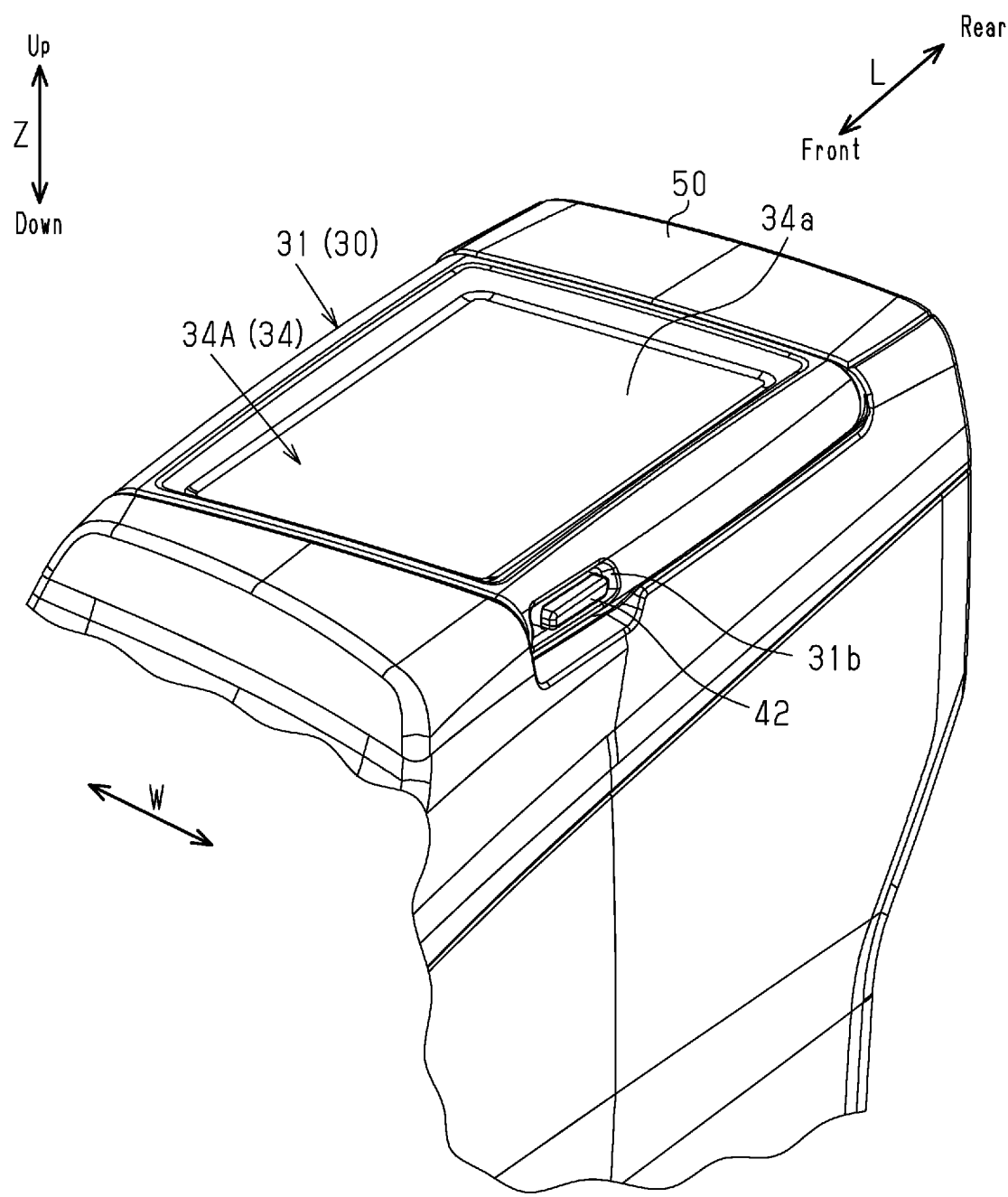
FIG. 9 is a perspective view corresponding to FIG. 1, illustrating a state in which the second surface of the lid is facing upward.

As shown in FIGS. 8B and 9, the second half body 34 includes a second surface 34A, which is located on a back side of the first surface 32A in the lid main body 31. The second surface 34A includes a tray surface with a recess 34a.

As shown in FIGS. 8A and 8B, the box main body 10 and the lid 30 have shapes that allow the lid 30 to be attached to the box main body 10 regardless of which of the first surface 32A and the second surface 34A is facing upward.

Functional Members 40

As shown in FIG. 3, the two functional members 40 are respectively provided at the opposite sides in the vehicle width direction W of the lid main body 31. The functional members 40 are slidable in the vehicle width direction W with respect to the lid main body 31.

Each functional member 40 includes a pivot 41, an operation portion 42, and a coupling plate 43.

The coupling plate 43 extends in the front-rear direction L and in the vehicle width direction W. The front and rear shafts of the pivot 41 are respectively coupled to the front end and the rear end of the coupling plate 43. The front and rear shafts of the pivot 41 are located on the same axis extending in the front-rear direction L. That is, the axial direction of the pivot 41 agrees with the front-rear direction L. Accordingly, the description will be made assuming that the axial direction of the pivot 41 is the axial direction L in some cases.

An operation portion 42 is coupled to the outer edge in the vehicle width direction W of each coupling plate 43. The operation portion 42 has a shape elongated in the front-rear direction L.

The coupling plate 43 includes protrusions 44, which extend in the vehicle width direction W, on the upper and lower surfaces.

The coupling plate 43 includes spring seats 46 on the edge on the inner side in the vehicle width direction W. The spring seats 46 are provided at the opposite ends in the front-rear direction L of the coupling plate 43.

In the present embodiment, each functional member 40 is molded in one piece with a hard plastic. That is, the functional member 40 is a one piece component having the pivot 41, the operation portion 42, and the coupling plate 43.

The two functional members 40 are independent of each other. That is, the two operation portions 42 are independent of each other.

Structure 2 of Lid Main Body 31

Figure 5:
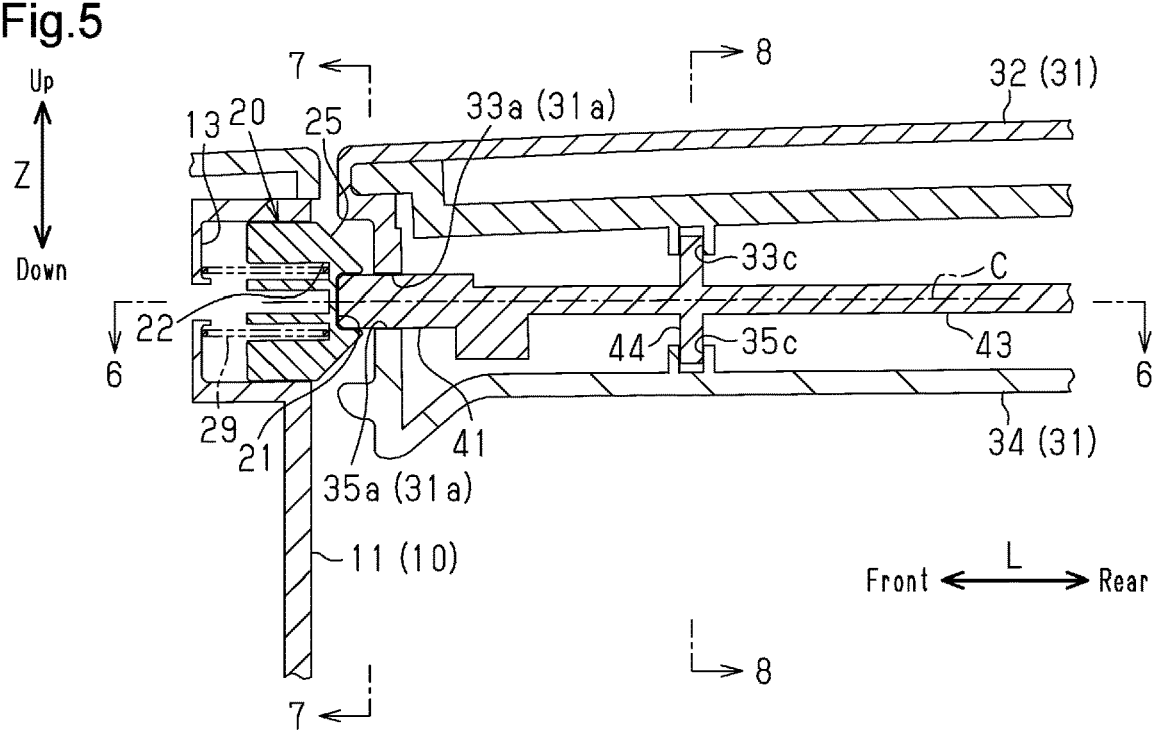
FIG. 5 is a cross-sectional view of the console box according to the first embodiment.

As shown in FIG. 5, the first half body 32 includes half holes 33a at the front end. Although not illustrated, the first half body 32 includes half holes 33a also at the rear end. The half holes 33a are provided at opposite sides in the vehicle width direction W of the first half body 32.

As shown in FIGS. 3 and 5, the second half body 34 includes half holes 35a at opposite sides in the front-rear direction L. The half holes 35a are provided at opposite sides in the vehicle width direction W.

The half holes 33a, 35a form shaft holes 31a, which receive the pivots 41 of the functional members 40. The shaft holes 31a each have a shape elongated in the width direction W of the lid 30. The shaft holes 31a allow the functional members 40 to slide in the vehicle width direction W with respect to the lid main body 31.

As shown in FIG. 3, the first half body 32 includes cutouts 33b respectively at the opposite sides in the vehicle width direction W. The second half body 34 includes cutouts 35b respectively at the opposite sides in the vehicle width direction W.

The cutouts 33b, 35b form operation holes 31b, which receive the operation portions 42 of the functional members 40. The operation holes 31b each have a shape elongated in the front-rear direction L in correspondence with the operation portion 42.

As shown in FIG. 5, the first half body 32 includes two supporting rails 33c on the inner surface. The supporting rails 33c extend in the vehicle width direction W in correspondence with the upper protrusions 44 of the functional members 40.

As shown in FIGS. 3 and 5, the second half body 34 includes two supporting rails 35c on the inner surface. The supporting rails 35c extend in the vehicle width direction W in correspondence with the lower protrusions 44 of the functional members 40.

The upper protrusion 44 is fitted between the two supporting rails 33c. The lower protrusion 44 is fitted between the two supporting rails 35c. The two supporting rails 33c and the two supporting rails 35c support the functional members 40 such that the functional members 40 are slidable in the vehicle width direction W.

As shown in FIG. 3, the second half body 34 includes spring seats 35d at positions that are opposed to the spring seats 46 of the functional members 40 in the vehicle width direction W.

Each first spring 49 is provided in a compressed state between one of the spring seat 35d and the corresponding spring seat 46. The first springs 49 always urge the functional members 40, that is, the operation portions 42 outward in the width direction W. Each first spring 49 corresponds to a first urging member according to the present disclosure.

<Shims 20>

Figure 4A:
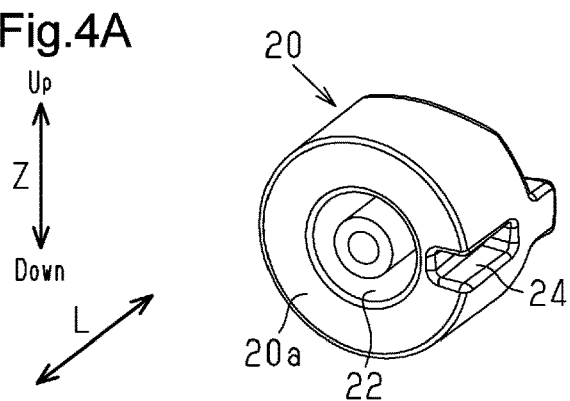
FIGS. 4A and 4B are perspective views of a shim according to the first embodiment.
Figure 4B:
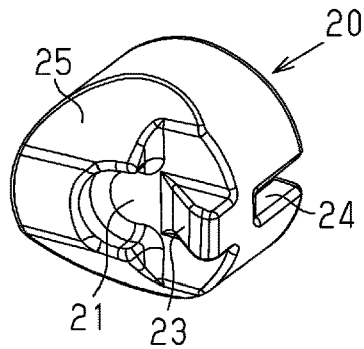

As shown in FIGS. 4A and 4B, each shim 20 is substantially columnar. The shim 20 of the present embodiment has a symmetrical shape with respect to the up-down direction Z.

Figure 6:
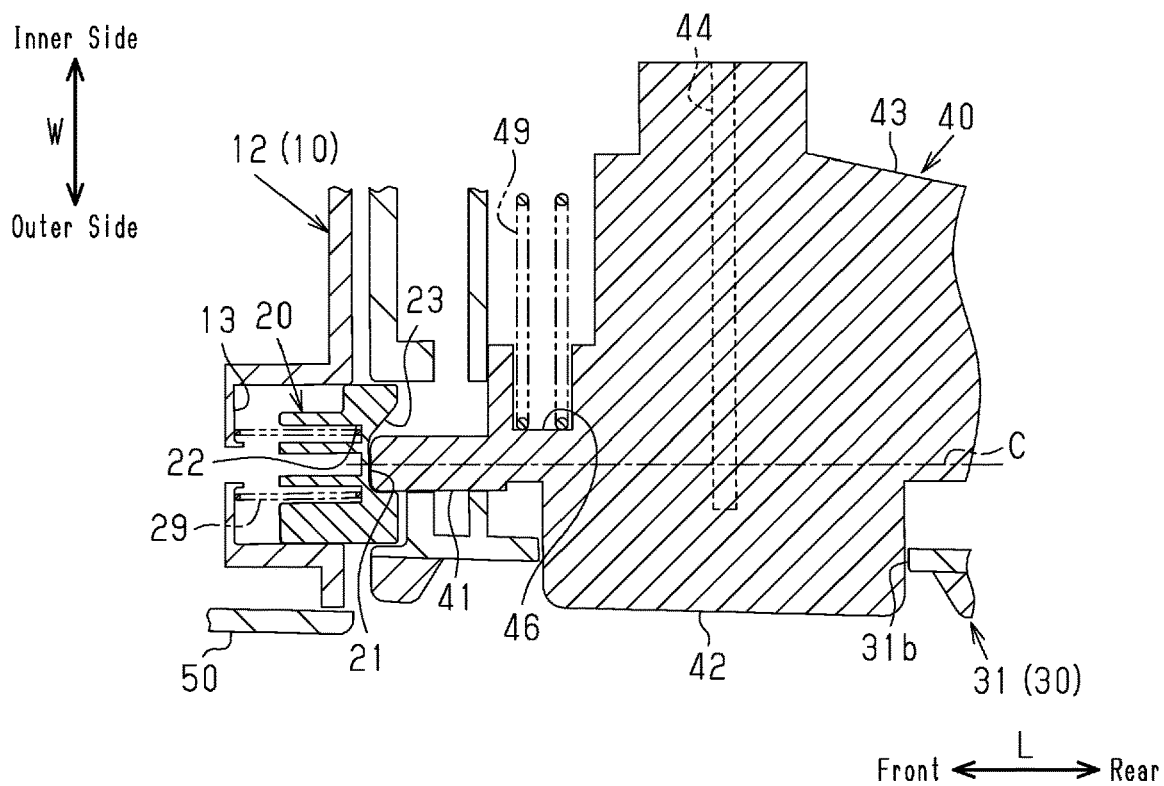
FIG. 6 is a cross-sectional view taken along line 6-6 of FIG. 5.

As shown in FIGS. 4A, 5, and 6, the shim 20 has an end face 20a, which faces the bottom surface of the shim receiving recess 13. An annular recess 22 is provided in the end face 20a.

As shown in FIGS. 5 and 6, a second spring 29 is provided in a compressed state between the bottom surface of the shim receiving recess 13 and the bottom surface of the annular recess 22. The second spring 29 always urges the shim 20 rearward. That is, the console box includes the shims 20 and the second springs 29, and each second spring 29 always urges the corresponding shim 20 toward the corresponding pivot 41 in the axial direction L. Each second spring 29 corresponds to a second urging member according to the present disclosure.

As shown in FIGS. 4A and 4B, each shim 20 includes a locking recess 24 in the outer circumferential surface. The locking recess 24 extends in the front-rear direction L. The locking recess 24 opens in the end face 20a. The locking recess 24 is locked to the locking projection 13a of the shim receiving recess 13. This installs the shim 20 in the box main body 10 in a non-rotatable manner.

As shown in FIGS. 4B, 5, and 6, each shim 20 includes a receiving recess 21, which receives and rotatably supports an end in the axial direction L of the pivot 41.

As shown in FIGS. 4B and 6, the receiving recess 21 has an inner inclined surface 23 in a section of the inner circumferential surface that is on the inner side in the vehicle width direction W.

As shown in FIG. 6, the inner inclined surface 23 is inclined such that a given point on the inner inclined surface 23 moves inward in the vehicle width direction W as that point moves rearward. That is, the inner inclined surface 23 is inclined such that a given point on the inner inclined surface 23 moves inward in the vehicle width direction W as that point moves outward in the receiving recess 21 in the axial direction L. The inner inclined surface 23 is located at a position where it overlaps with the pivot 41 in the width direction W.

As shown in FIGS. 4B and 5, each shim 20 has an outer peripheral inclined surface 25 in an upper part of the outer circumferential surface.

As shown in FIG. 5, the outer peripheral inclined surface 25 is inclined such that a given point on the outer peripheral inclined surface 25 moves downward as that point moves rearward. That is, the outer peripheral inclined surface 25 is inclined such that a given point on the outer peripheral inclined surface 25 moves downward as that point moves toward the pivot 41 in the axial direction L. The outer peripheral inclined surface 25 is located at a position where it overlaps with the pivot 41 in the up-down direction.

Operation of the present embodiment will now be described.

When one of the operation portions 42 is pushed inward in the width direction W, the ends in the axial direction L of the corresponding pivot 41 push the inner inclined surfaces 23 of the receiving recesses 21 of the corresponding shims 20 inward in the width direction W.

Since each inner inclined surface 23 is inclined such that a given point on the inner inclined surface 23 moves inward in the vehicle width direction W as that point moves outward in the receiving recess 21 in the axial direction L as shown in FIG. 6, the shim 20 moves away from the pivot 41 in the axial direction L against the urging force of the second spring 29. Then, when the pivot 41 is dislodged from the receiving recesses 21 of the shims 20, the pivot 41 and the box main body 10 are decoupled from each other.

In this manner, when one of the two operation portions 42 is pushed inward, the box main body 10 and the pivot 41 that corresponds to that operation portion 42 are decoupled from each other. This allows the lid 30 to pivot about the axis C of the pivot 41 of the other operation portion 42 (Operation 1).

The two operation portions 42 are independent of each other. Thus, when both of the operation portions 42 are pushed inward, both pivots 41 and the box main body 10 are decoupled from each other. This allows the lid 30 to be detached from the box main body 10 (Operation 2).

When the lid 30 is pushed against the box main body 10 to attach the lid 30 to the box main body 10, the ends in the axial direction L of the pivots 41 push down the outer peripheral inclined surfaces 25 of the receiving recesses 21 of the shims 20.

Since each outer peripheral inclined surface 25 is inclined such that a given point on the outer peripheral inclined surface 25 moves downward as that point moves toward the pivot 41 in the axial direction L as shown in FIG. 5, the shim 20 moves away from the pivot 41 in the axial direction L against the urging force of the second spring 29. When the pivot 41 is lowered to the axis of the shim 20, the urging force of the second spring 29 moves the shim 20 in the axial direction L toward the pivot 41, so that the end of the pivot 41 in the axial direction L is received by the receiving recess 21 of the shim 20. This couples the pivot 41 to the box main body 10 (Operation 3).

The present embodiment has the following advantages.

(1-1) The lid 30 includes the lid main body 31, the two pivots 41, and the two operation portions 42. The lid 30 is configured to pivot about an axis C of a selected one of the pivots 41. The lid 30 is also configured to be detached from the box main body 10 when both of the operation portions 42 are operated simultaneously.

This configuration performs Operations 1 and 2 of the present embodiment, and thus does not require a device for preventing the operation portions 42 from being operated simultaneously. This simplifies the structure of the lid 30 and reduces the number of components.

(1-2) The lid main body 31 has the first surface 32A and the second surface 34A, which is located on the back side of the first surface 32A. The box main body 10 and the lid 30 have shapes that allow the lid 30 to be attached to the box main body 10 regardless of which of the first surface 32A and the second surface 34A is facing upward.

This configuration allows the lid 30 to be attached to the box main body 10 regardless of which of the first surface 32A and the second surface 34A of the lid main body 31 is facing upward.

(1-3) The first surface 32A includes an armrest surface. The second surface 34A includes a tray surface with the recess 34a.

This configuration allows the lid 30 to be used as an armrest when the lid 30 is attached to the box main body 10 with the first surface 32A of the lid main body 31 facing upward. This configuration also allows the lid 30 to be used as a tray when the lid 30 is attached to the box main body 10 with the second surface 34A of the lid main body 31 facing upward.

(1-4) The box main body 10 includes the lifting mechanisms 19.

With this configuration, the lid 30 is lifted by the lifting mechanisms 19 when the two operation portions 42 are pushed inward simultaneously so that the pivots 41 and the box main body 10 are decoupled from each other. This prevents a situation from occurring in which the lid 30 cannot be detached because the pivots 41 are coupled to the box main body 10 again after the operation portions 42 stop being pushed inward.

(1-5) Each shim 20 has the inner inclined surface 23.

Since this configuration is capable of performing the above-described Operation 1, the lid 30, which includes the pivots 41 and the operation portions 42, is obtained using a simple structure. Also, the lid 30 can be easily detached from the box main body 10.

(1-6) Each shim 20 has the outer peripheral inclined surface 25.

Since this configuration is capable of performing the above-described Operation 3, the lid 30, which includes the pivots 41 and the operation portions 42, is obtained using a simple structure. Also, the lid 30 can be easily attached to the box main body 10.

Second Embodiment

A second embodiment will now be described with reference to FIGS. 11 to 20. Differences from the first embodiment will mainly be discussed.

The present embodiment is different from the first embodiment in that pivots are formed separately from operation portions.

In the following description, reference numerals 1, which are obtained by adding 100 to the reference numerals  in the first embodiment, are given to components in the second embodiment that are the same as or equivalent to those in the first embodiment, and redundant explanations are omitted.

<Box Main Body 110>

Figure 16:
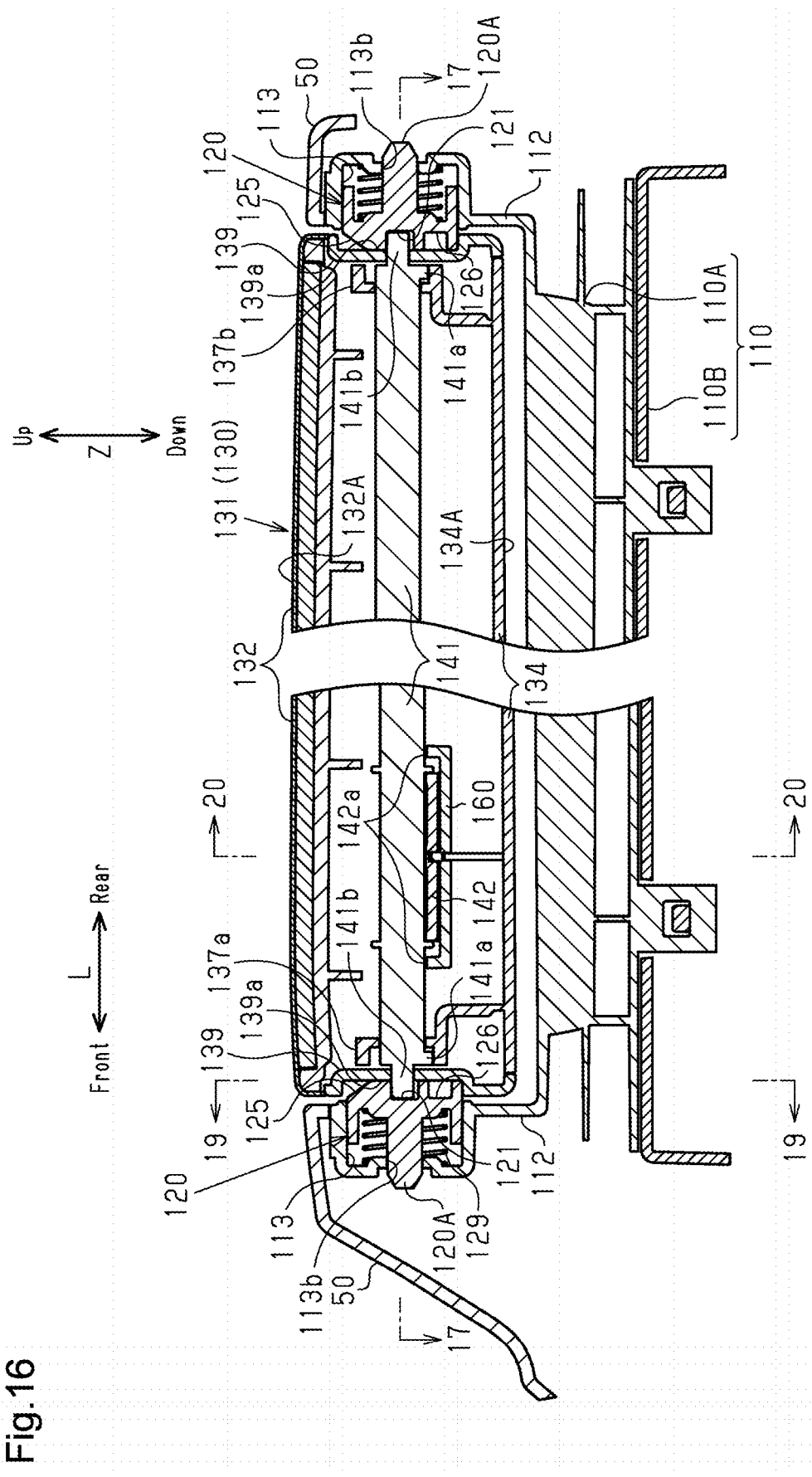
FIG. 16 is a longitudinal partial cross-sectional view of an upper portion of the console box according to the second embodiment.
Figure 19:
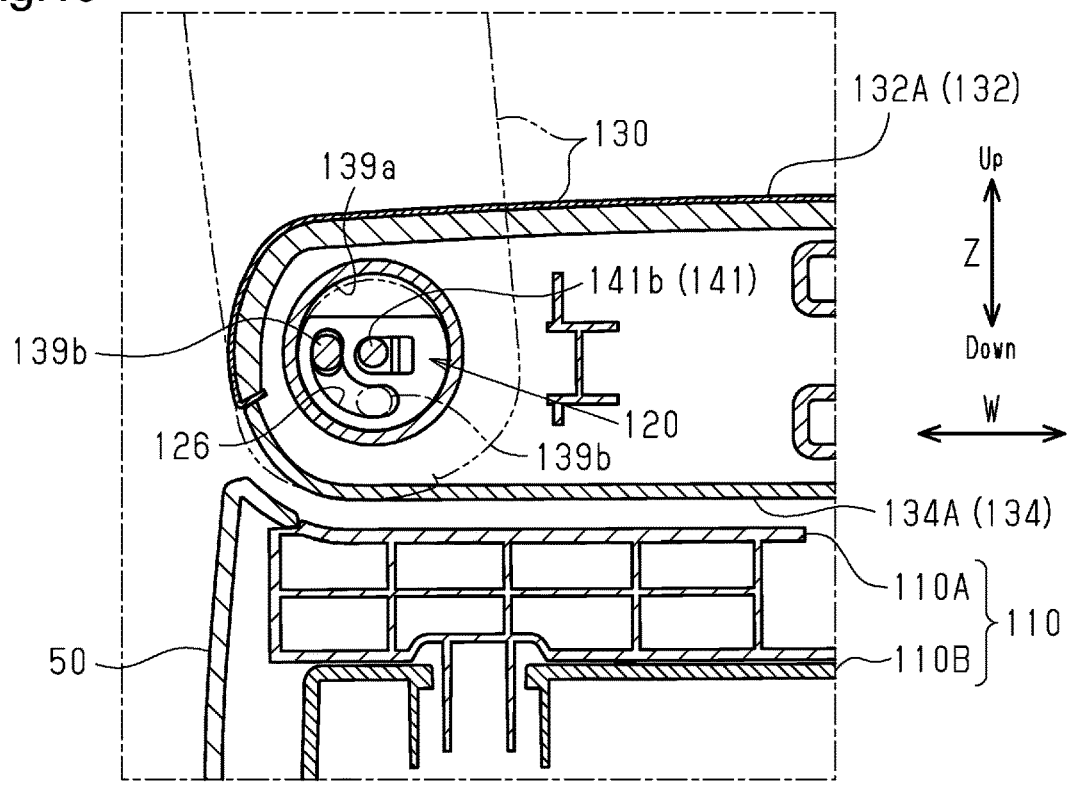
FIG. 19 is a partial cross-sectional view taken along line 19-19 of FIG. 16, showing the upper portion of the console box.
Figure 20:
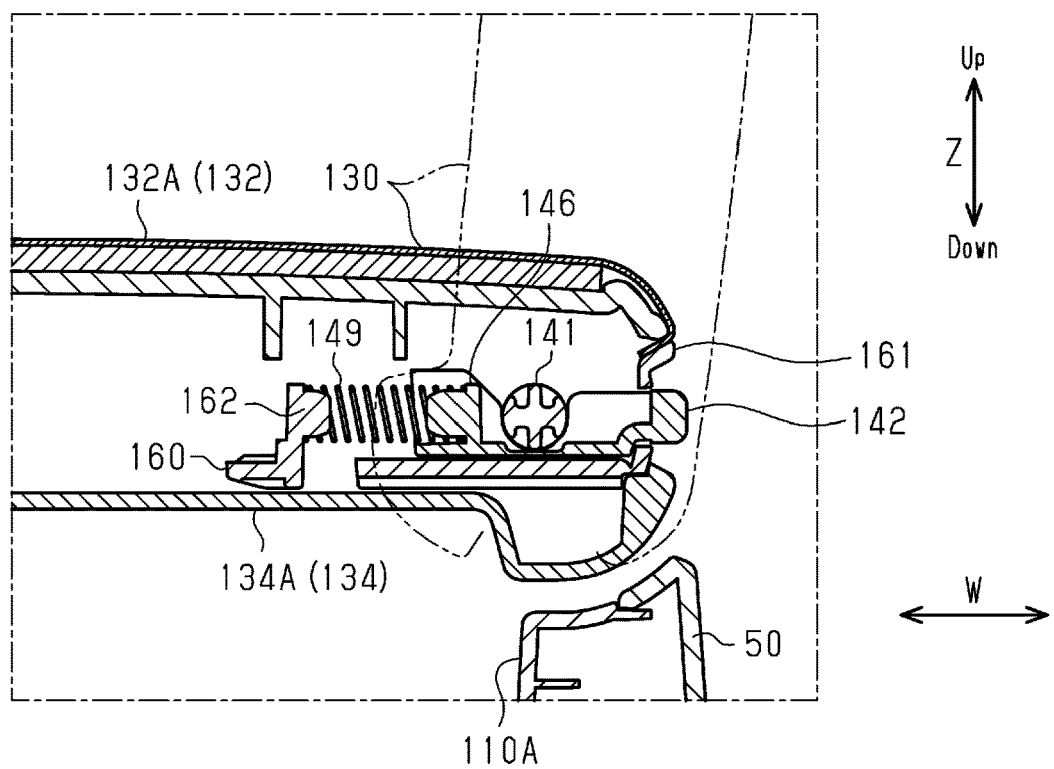
FIG. 20 is a partial cross-sectional view taken along line 20-20 of FIG. 16, showing the upper portion of the console box.

As shown in FIGS. 16 and 19, a box main body 110 includes a supporting frame 110A and a box portion 110B, which is formed separately from the supporting frame 110A.

The supporting frame 110A has an upper opening 111 of the box main body 110 and front and rear supporting portions 112, and forms an upper part of the box main body 110.

The box portion 110B forms a lower part of the box main body 110.

The supporting frame 110A is attached to an upper part of the box portion 110B by a snap-fit structure.

Figure 11:
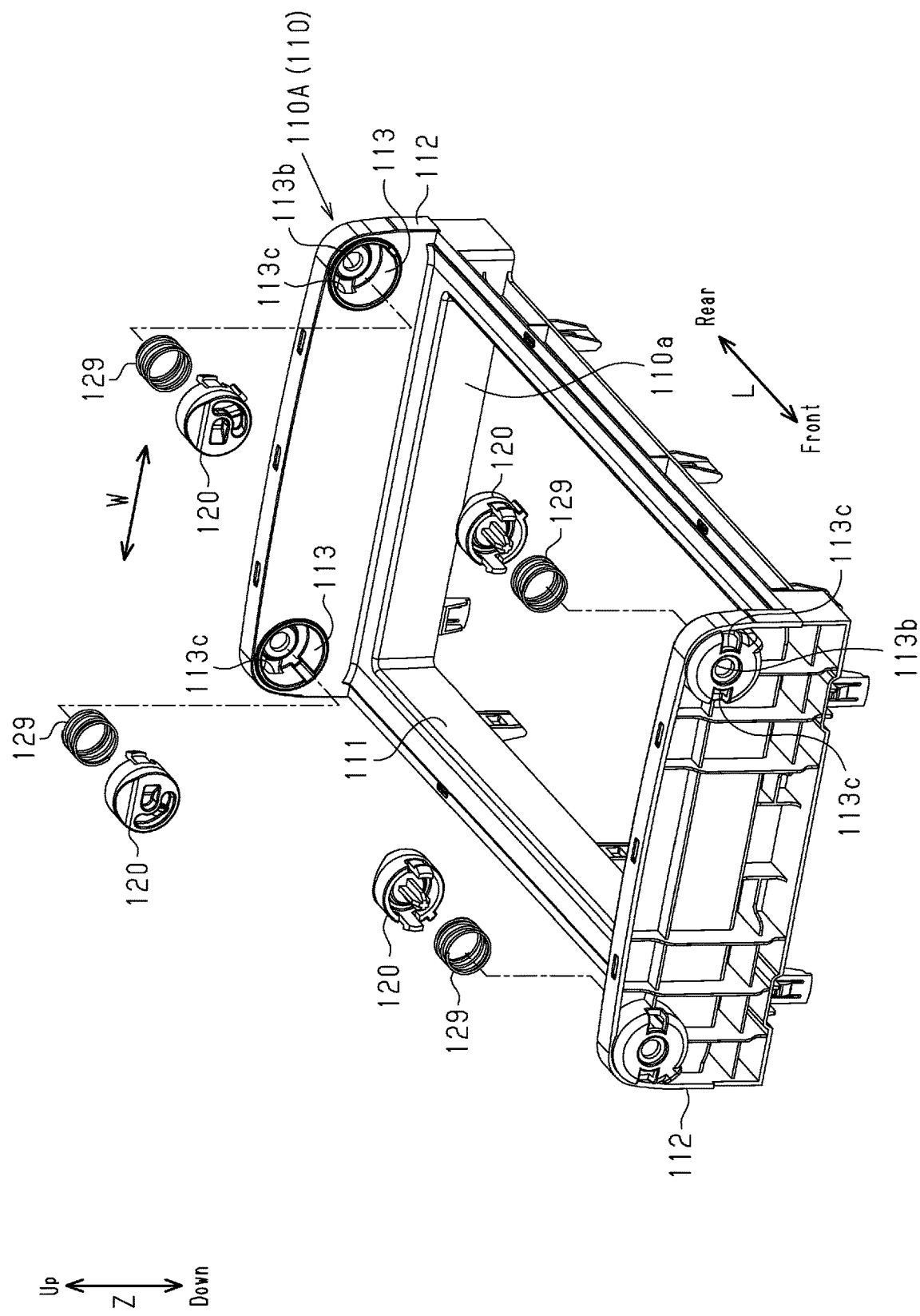
FIG. 11 is an exploded perspective view of a supporting frame, shims, and second springs that form an upper portion of a box main body according to a second embodiment.
Figure 13:
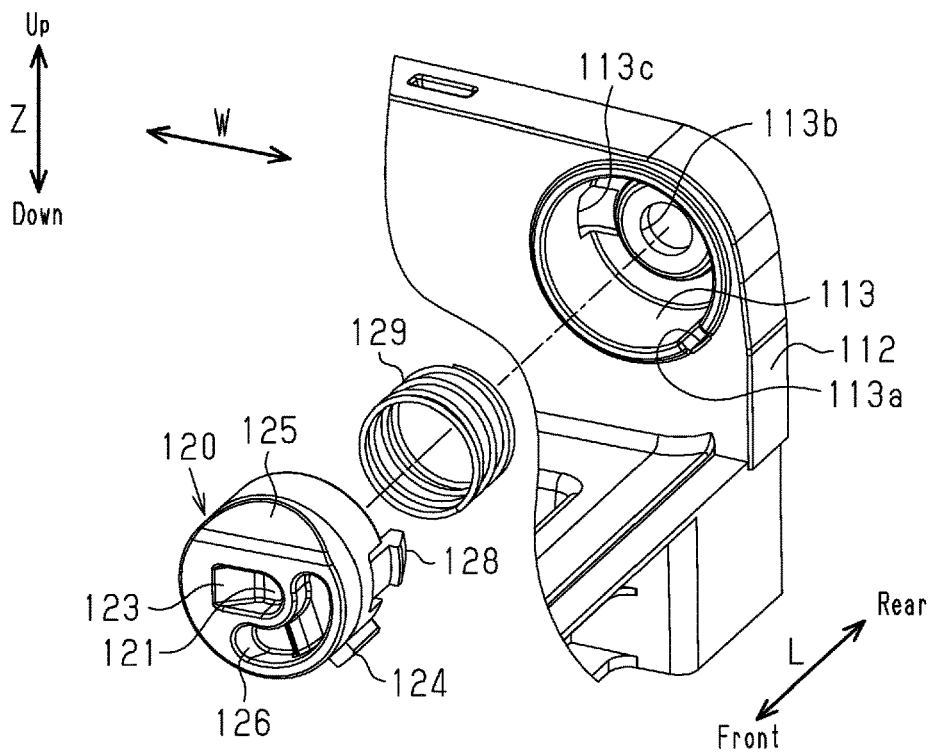
FIG. 13 is an exploded partial perspective view mainly showing a rear portion of the supporting frame, a shim, and a second spring according to the second embodiment.

As shown in FIGS. 11 and 13, the front and rear supporting portions 112 include a total of four shim receiving recesses 113 at opposite sides in the vehicle width direction W.

As shown in FIG. 13, each shim receiving recess 113 includes a locking groove 113a, a receiving hole 113b, and two locking holes 113c.

The locking groove 113a is provided in the inner circumferential surface of the shim receiving recess 113 and extends in the front-rear direction L.

The receiving hole 113b extends through the center of the bottom of the shim receiving recess 113.

The two locking holes 113c extend from the bottom of the shim receiving recess 113 to the circumferential wall at positions on the opposite sides of the receiving hole 113b. The two locking holes 113c are located on the opposite sides of the receiving hole 113b in the vehicle width direction W.

<Lid 130>

Figure 14:
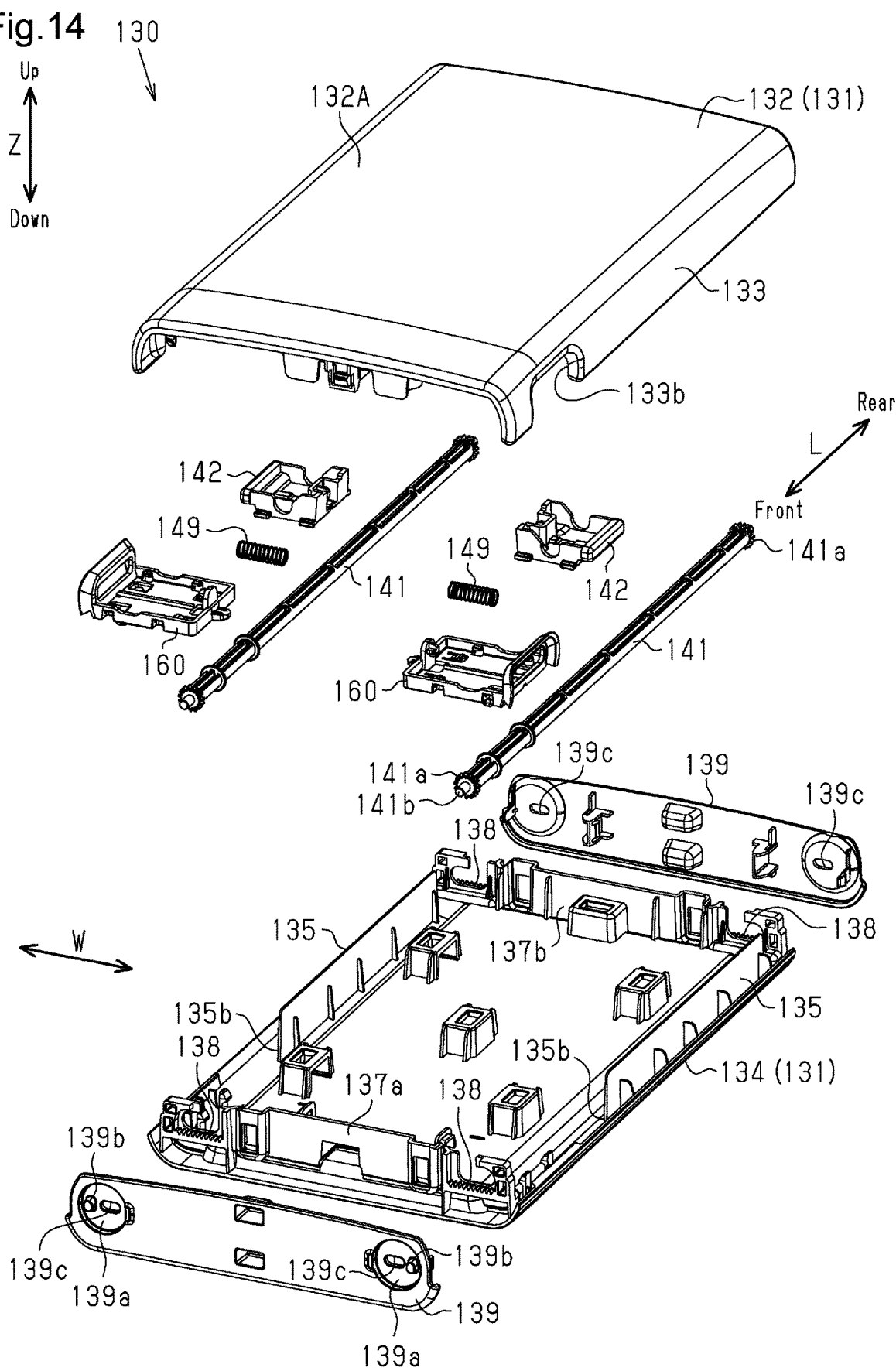
FIG. 14 is an exploded perspective view of a lid according to the second embodiment.

As shown in FIG. 14, the lid 130 includes a lid main body 131, two pivots 141, two operation portions 142, two first springs 149, and two bases 160.

The lid main body 131 includes a first half body 132, which has a first surface 132A, a second half body 134, which has a second surface 134A, and front and rear end plates 139 (refer to FIG. 16 for the second surface 134A).

The first half body 132 includes two side wall portions 133 at opposite sides in the vehicle width direction W. The side wall portions 133 extend in the front-rear direction L. Each side wall portion 133 has a cutout 133b in a front part.

The second half body 134 includes two side wall portions 135 at opposite sides in the vehicle width direction W. The side wall portions 135 extend in the front-rear direction L. Each side wall portion 135 has a cutout 135b in a front part. The cutouts 133b and the cutouts 135b form operation holes 131b (refer to FIG. 17).

The second half body 134 includes a front wall portion 137a and a rear wall portion 137b, which extend in the vehicle width direction W, at the front end and the rear end.

The front end plate 139 is attached to the front wall portion 137a of the second half body 134. The rear end plate 139 is attached to the rear wall portion 137b of the second half body 134. The front and rear end plates 139 form the front and rear surfaces of the lid 130.

The front end plate 139 has two recesses 139a in the front surface. The recesses 139a are provided at opposite sides in the vehicle width direction of the end plate 139 (refer to FIG. 17). Each recess 139a has a shaft hole 139c in the bottom. The shaft hole 139c extends through the end plate 139 in the front-rear direction L and is elongated in the vehicle width direction W. The shaft holes 139c receive pin portions 141b of the pivots 141, which will be discussed below.

A projection 139b is provided on the bottom surface of each recess 139a. The projection 139b is received by an allowance recess 126 of a shim 120, which will be discussed below (refer to FIG. 19).

Figure 15:
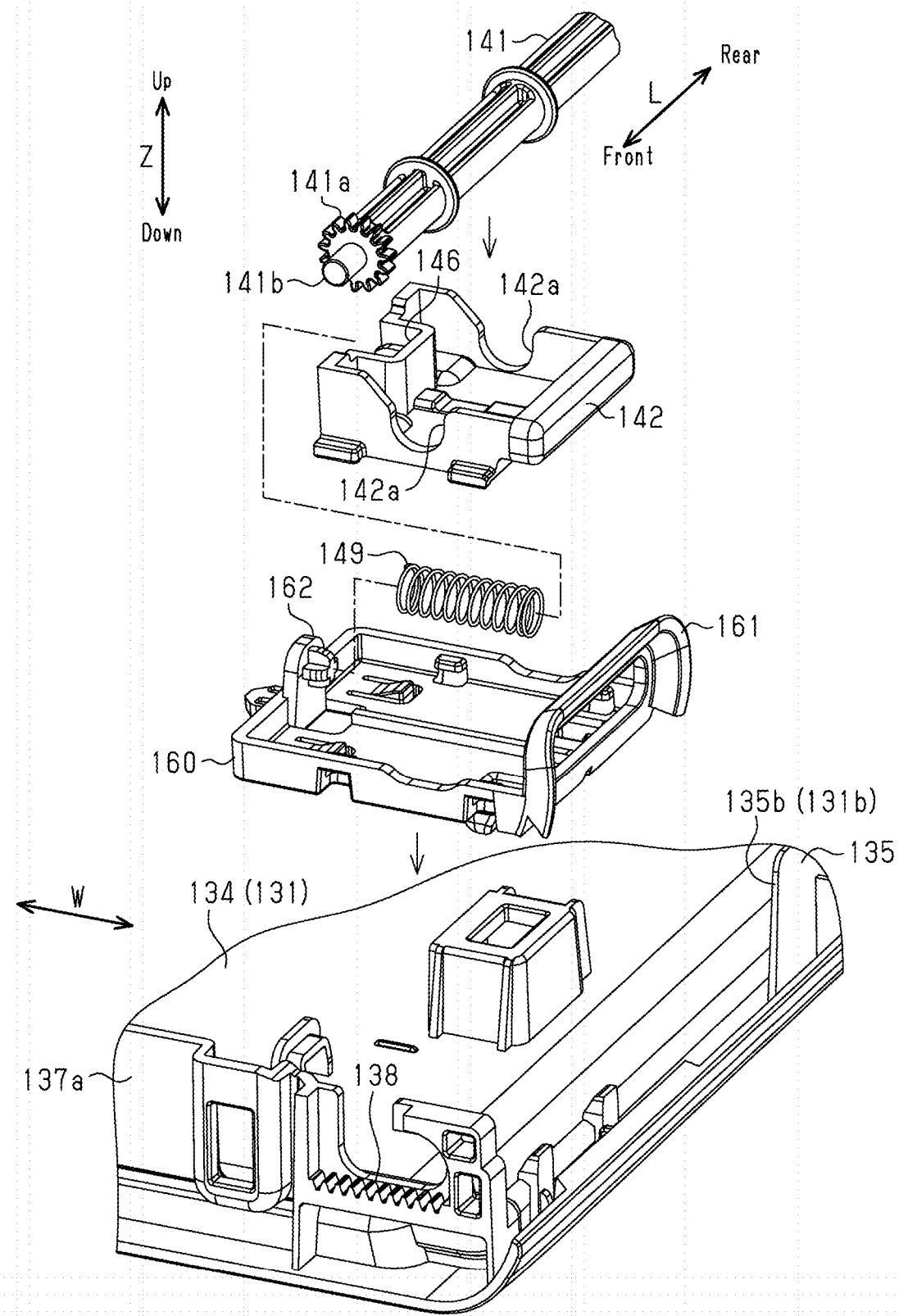
FIG. 15 is an exploded partial perspective view mainly showing an operation portion of the lid according to the second embodiment.

As shown in FIGS. 14 and 15, each pivot 141 has two pinions 141a and two pin portions 141b.

The pinions 141a are respectively provided at the opposite ends of each pivot 141.

The pin portions 141b form the ends of the pivot 141. The pinions 141a are located inward of the pin portions 141b in the axial direction of the pivot 141.

The second half body 134 includes a total of four racks 138 at the opposite sides in the vehicle width direction W of the front wall portion 137a and the rear wall portion 137b. The racks 138 extend in the vehicle width direction W. The racks 138 mesh with the pinions 141a and support the pinions 141a such that the pinions 141a are rotatable and movable in the vehicle width direction W.

The two bases 160 are arranged side by side in the vehicle width direction W on the second half body 134.

Figure 17:
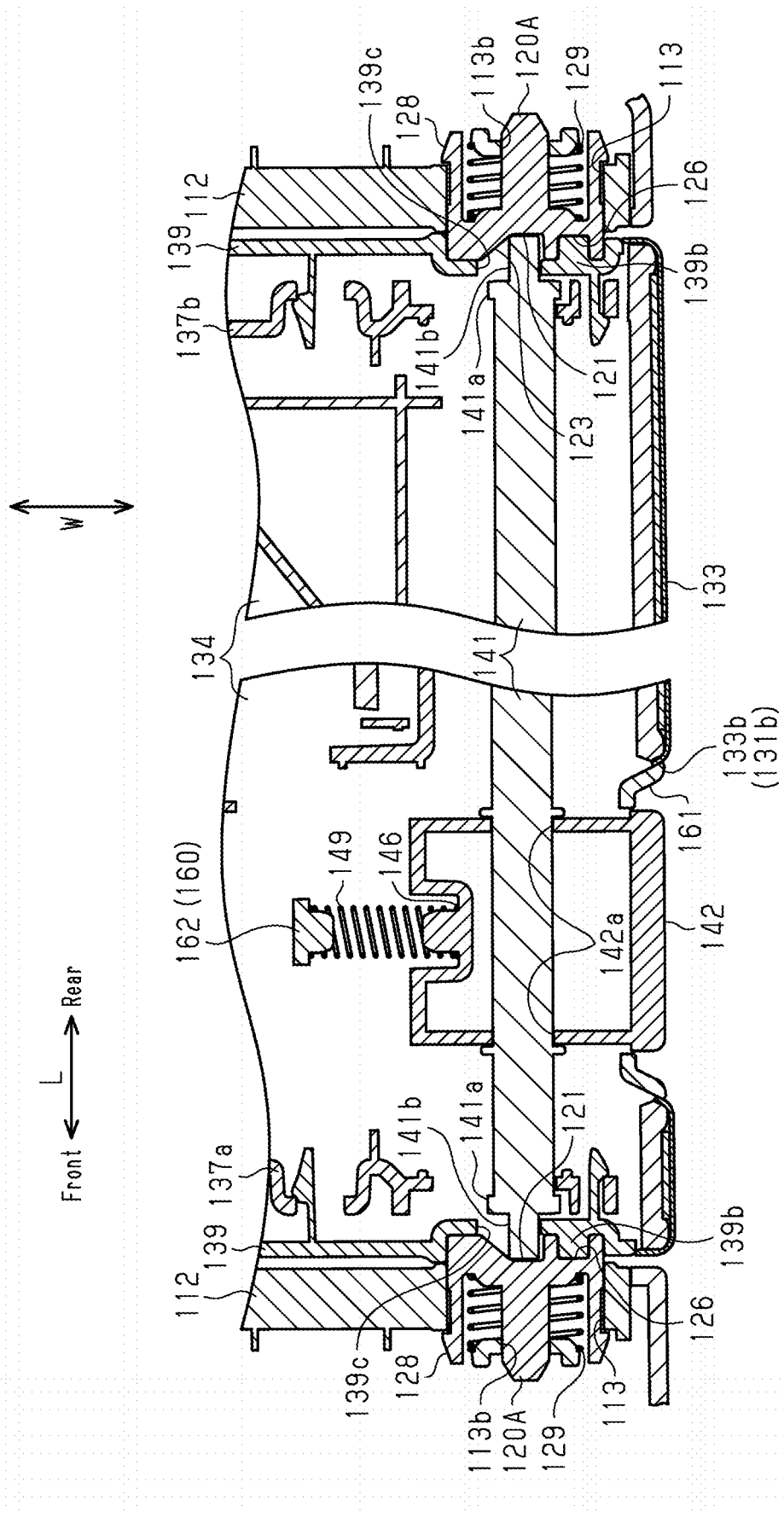
FIG. 17 is a partial cross-sectional view taken along line 17-17 of FIG. 16, showing the upper portion of the console box.

As shown in FIGS. 15 and 17, each base 160 includes a gate portion 161 at an outer part in the vehicle width direction W. The gate portion 161 is exposed to the outside of the lid 130 through the operation hole 131b. The base 160 includes a spring seat 162 on the upper surface. The spring seat 162 is located inward of the gate portion 161 in the vehicle width direction W.

Each operation portion 142 is provided on one of the bases 160 to be movable in the vehicle width direction W through the gate portion 161. The two operation portions 142 are independent of each other.

Each operation portion 142 includes a spring seat 146. The spring seat 146 is located outward of the spring seat 162 in the vehicle width direction W.

The first spring 149 is provided in a compressed state in the vehicle width direction W between the spring seat 162 and the spring seat 146. The first spring 149 always urges the operation portion 142 outward in the vehicle width direction W (refer to FIG. 20).

The operation portion 142 includes shaft receiving portions 142a at the opposite ends in the front-rear direction L. The shaft receiving portions 142a each have an arcuate shape opening upward. The shaft receiving portions 142a rotatably support the pivot 141.

<Shims 120>

Figure 12:
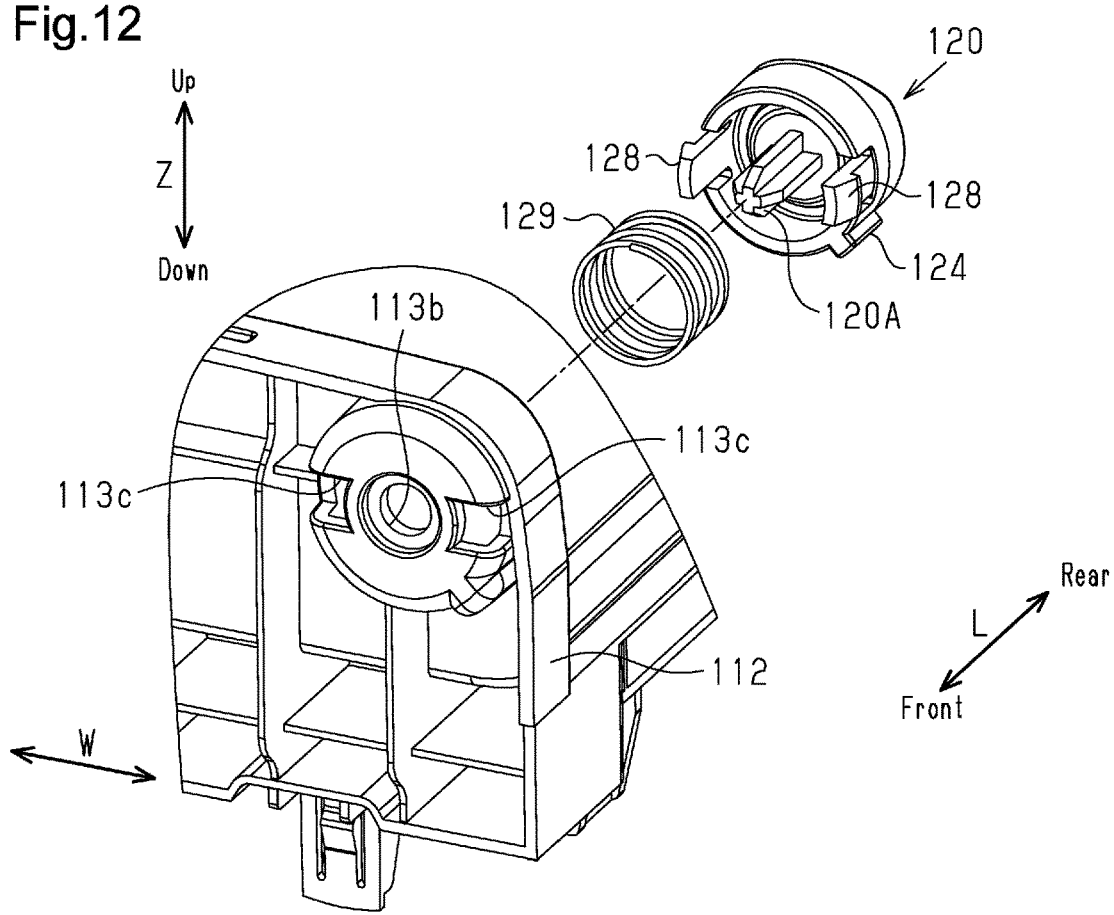
FIG. 12 is an exploded partial perspective view mainly showing a front portion of the supporting frame, a shim, and a second spring according to the second embodiment.

As shown in FIGS. 11 to 13, each shim 120 has a cylindrical shape with a closed end and is received by the corresponding shim receiving recess 113.

As shown in FIGS. 12 and 13, each shim 120 includes a shaft portion 120A, a receiving recess 121, a locking projection 124, an outer peripheral inclined surface 125, an allowance recess 126, and two hooks 128.

The shaft portion 120A projects toward the bottom surface of the shim receiving recess 113 and extends in the front-rear direction L. The shaft portion 120A is received by the receiving hole 113b so as to be movable in the front-rear direction L.

A second spring 129 is provided in a compressed state between the bottom surface of the shim receiving recess 113 and the bottom of the shim 120. Each second spring 129 corresponds to a second urging member according to the present disclosure.

The locking projection 124 projects from the outer circumferential surface of the shim 120 and is elongated in the front-rear direction L. The locking projection 124 is received by the locking groove 113a so as to be movable in the front-rear direction L, and is locked against rotation in the circumferential direction about the axis of the shim receiving recess 113.

The two hooks 128 project from the circumferential wall of the shim 120 toward the bottom surface of the shim receiving recess 113 and extend in the front-rear direction L. The two hooks 128 are respectively received by the two locking holes 113c so as to be movable in the front-rear direction L.

The shim 120 is installed in the shim receiving recess 113 so as to be non-rotatable but movable in the front-rear direction L.

Figure 18:
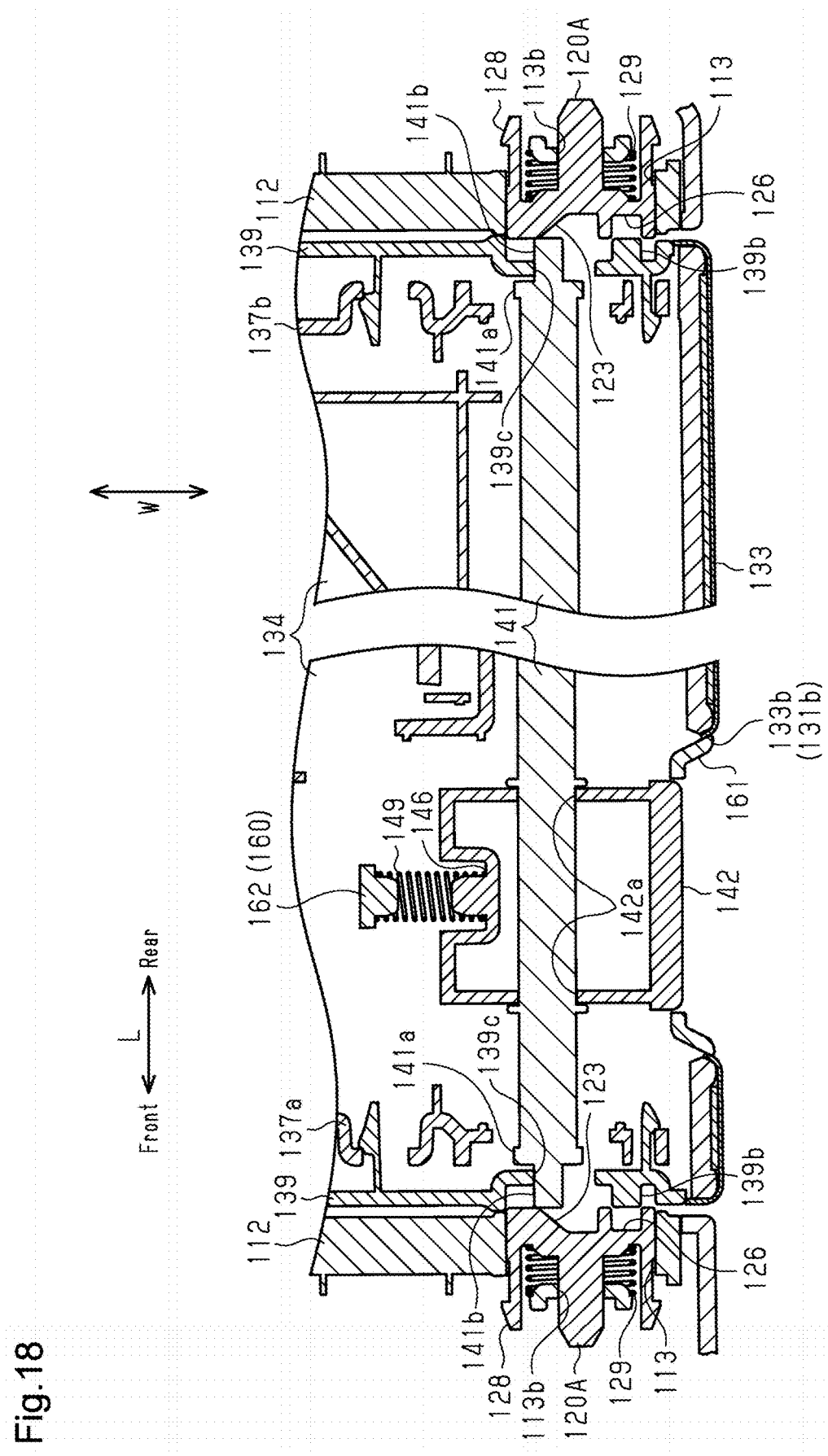
FIG. 18 a partial cross-sectional view corresponding to FIG. 17, showing the upper portion of the console box in a state in which an operation portion is pushed inward.

The shim 120 is configured to be movable in the front-rear direction L between a position at which the shim 120 contacts the bottom surface of the shim receiving recess 113 (refer to FIG. 17) and a position separated from the bottom surface (refer to FIG. 18).

The receiving recess 121 opens in the side of the shim 120 that is opposite to the side in which the shaft portion 120A is provided. The bottom surface of the receiving recess 121 is located at the center of the shim 120. An inner inclined surface 123 is provided at the inner side in the vehicle width direction W of the bottom surface of the receiving recess 121. The allowance recess 126 extends arcuately about the axis of the shim 120.

The present embodiment has the following advantages.

(2-1) The pivots 141 are formed separately from the operation portions 142. Each pivot 141 includes two pinions 141a at the opposite ends. The lid main body 131 includes two sets of racks 138, which mesh with the pinions 141a and support the pinions 141a such that the pinions 141a are rotatable and movable in the vehicle width direction W.

In the present embodiment, each operation portion 142 is provided at a position that is displaced in the axial direction of the corresponding pivot 141 from the middle position between a first end and a second end of the pivot 141. In this case, when the operation portion 142 is operated, the pushing force that acts on the inner inclined surface 123 of the receiving recess 121 of the shim 120 is likely to be different between the first end and the second end. This may hinder the pivots 141 being dislodged from the receiving recesses 121 of the shims 120.

In this regard, the above-described configuration includes the two pinions 141a at the opposite ends of each pivot 141. The pinions 141a respectively mesh with the corresponding two racks 138 on the lid main body 131, so that the pinions 141a are movable in the vehicle width direction W. Thus, when the operation portion 142 is operated, the pivot 141 moves inward in the width direction while rotating about its axis. This equalizes the pushing force that acts on the inner inclined surface 123 of the receiving recess 121 of the shim 120 between the first end and the second end. This allows the pivot 141 to be easily dislodged from receiving recesses 121 of the shims 120.

Third Embodiment

A third embodiment will now be described with reference to FIGS. 21 to 24. Differences from the second embodiment will mainly be discussed.

The present embodiment is different from the second embodiment in that each pivot is split into two sections in the axial direction, and in that shims are not provided.

In the following description, reference numerals 2, which are obtained by adding 100 to the reference numerals 1 in the second embodiment, are given to components in the third embodiment that are the same as or equivalent to those in the second embodiment, and redundant explanations are omitted. For example, in the third embodiment, the reference numeral 232 is given to a first half body, which corresponds to the first half body 132 in the second embodiment. Similarly, the reference numeral 233 is given to side wall portions, which correspond to the side wall portions 133 in the second embodiment.

<Box Main Body 210>

As shown in FIGS. 21 to 24, a box main body 210 includes a total of four shaft receiving portions 220, which receive first ends 272 and second ends 276 of pivots 241 and rotatably support the first ends 272 and the second ends 276.

The shaft receiving portions 220 are provided in front and rear supporting portions 212 of the box main body 210, and each have a cylindrical shape with a closed end.

<Pivots 241>

As shown in FIGS. 21 to 24, each pivot 241 includes a first shaft portion 271, which includes a first end 272, and a second shaft portion 275, which includes a second end 276. The first end 272 and the second end 276 are respectively the front end and the rear end of the pivot 241.

The first end 272 has a columnar shape. A proximal portion of each pivot 241 except for the first end 272 has the shape of a flat plate extending in the front-rear direction L and the vehicle width direction W (refer to FIG. 21).

Figure 21:
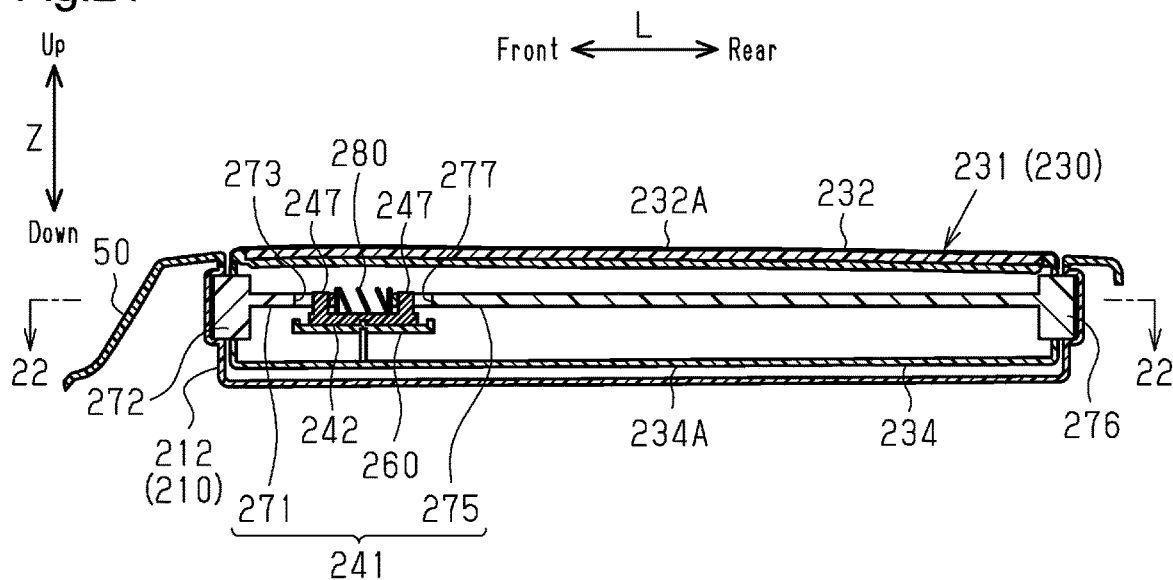
FIG. 21 is a vertical partial cross-sectional view of an upper portion of a console box according to a third embodiment.
Figure 23:
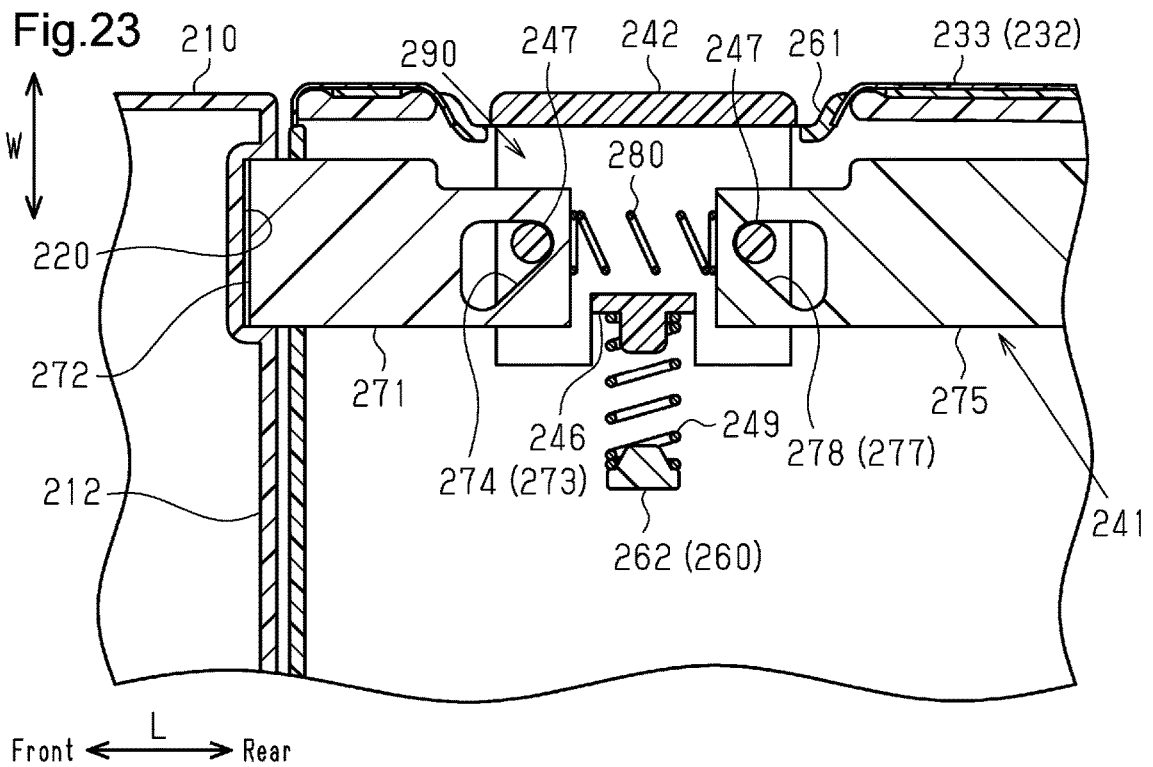
FIG. 23 is an enlarged partial cross-sectional view of FIG. 22.

As shown in FIGS. 21 and 23, the proximal portion includes a through-hole 273, which extends in the up-down direction Z, at the rear end portion. The through-hole 273 has an inclined surface 274 in the inner peripheral surface. The inclined surface 274 is inclined such that a given point on the inclined surface 274 moves forward as that point moves inward in the vehicle width direction W (refer to FIG. 23).

The second end 276 has a columnar shape. A proximal portion of each pivot 241 except for the second end 276 has the shape of a flat plate extending in the front-rear direction L and the vehicle width direction W (refer to FIG. 21).

As shown in FIGS. 21 and 23, the proximal portion includes a through-hole 277, which extends in the up-down direction Z, at the front end portion. The through-hole 277 has an inclined surface 278 in the inner peripheral surface. The inclined surface 278 is inclined such that a given point on the inclined surface 278 moves rearward as that point moves inward in the vehicle width direction W (refer to FIG. 23).

A second spring 280 is provided between the first shaft portion 271 and the second shaft portion 275 to urge the first shaft portion 271 and the second shaft portion 275 away from each other. That is, the lid 230 includes the second springs 280. The first end 272 of the first shaft portion 271 and the second end 276 of the second shaft portion 275 are urged by the second spring 280 so as to be respectively held inside the front and rear shaft receiving portions 220. Each second spring 280 corresponds to a shaft portion urging member according to the present disclosure.

<Bases 260>

As shown in FIGS. 21 to 24, two bases 260 are provided on a second half body 234. The bases 260 are each located between the corresponding first shaft portion 271 and the corresponding second shaft portion 275.

As shown in FIG. 23, each base 260 includes a gate portion 261 at an outer part in the vehicle width direction W. The base 260 includes a spring seat 262 on the upper surface.

<Operation Portions 242>

As shown in FIGS. 21 to 24, an operation portion 242 is provided on each base 260 to be movable in the vehicle width direction W through the gate portion 261. The operation portion 242 is formed separately from the first shaft portion 271 and the second shaft portion 275. The operation portion 242 is located between and independent of the first shaft portion 271 and the second shaft portion 275. The operation portion 242 is configured to be pushed inward in the vehicle width direction W with respect to a lid main body 231.

A lid 230 includes first springs 249, which always urge the operation portions 242 outward in the vehicle width direction W. Each first spring 249 is provided between the spring seat 262 of the corresponding base 260 and a spring seat 246 of the corresponding operation portion 242. The first spring 249 is provided in a compressed state in the vehicle width direction W. The first spring 249 always urges the operation portion 242 outward in the vehicle width direction W.

Each operation portion 242 includes two pin portions 247 projecting upward on the upper surface.

The two pin portions 247 are respectively received by the through-hole 273 of the first shaft portion 271 and the through-hole 277 of the second shaft portion 275.

<Interlocking Mechanism 290>

As shown in FIG. 23, an interlocking mechanism 290 links the operation portion 242 to the first shaft portion 271 and the second shaft portion 275. In conjunction with an inward movement of the operation portion 242 in the vehicle width direction W, the interlocking mechanism 290 moves the first shaft portion 271 and the second shaft portion 275 toward each other. That is, the lid 230 includes the interlocking mechanism 290.

The interlocking mechanism 290 includes the two pin portions 247 of the operation portion 242, the through-hole 273 of the first shaft portion 271, and the through-hole 277 of the second shaft portion 275.

Figure 22:
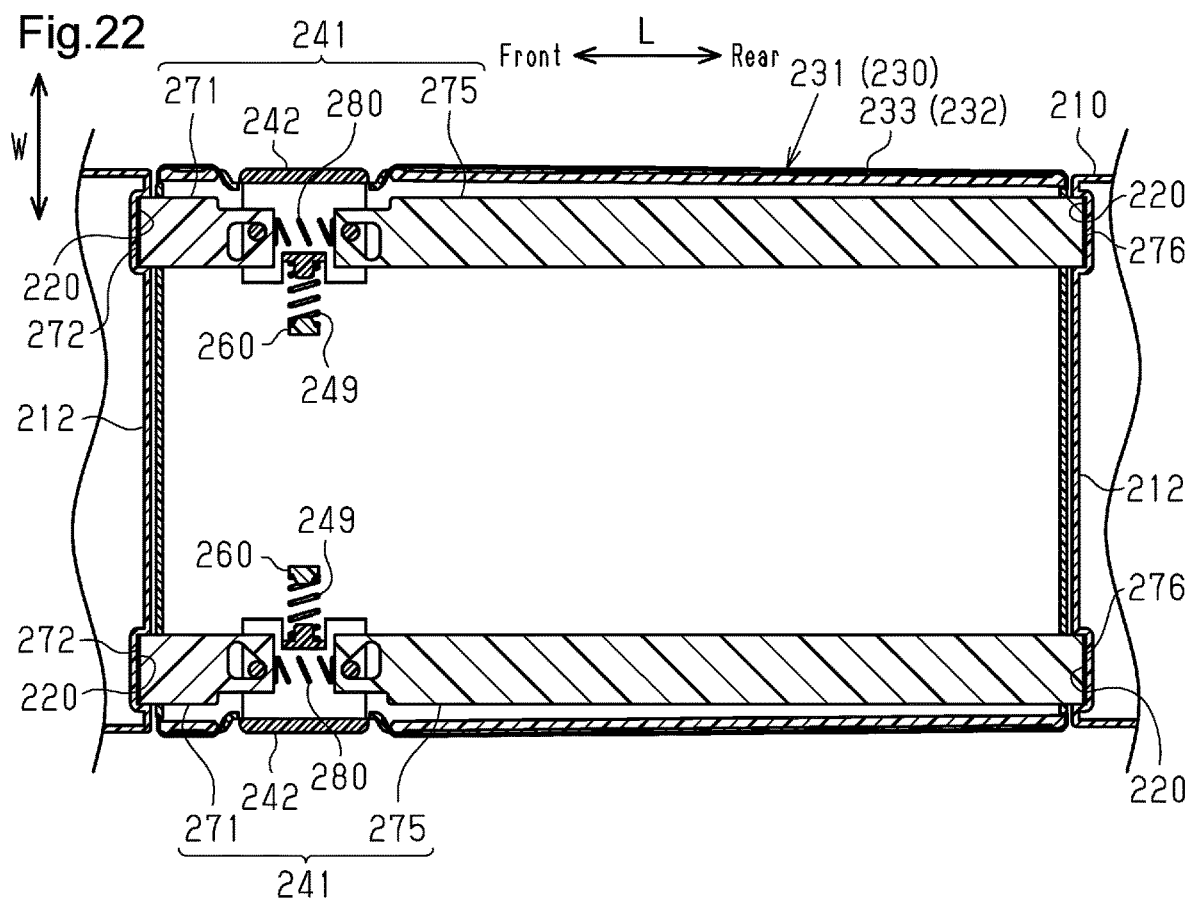
FIG. 22 is a partial cross-sectional view taken along line 22-22 of FIG. 21, showing the upper portion of the console box.

In a state in which the operation portions 242 are not pushed inward as shown in FIGS. 21 to 23, the two pin portions 247 are located at the outermost positions in the vehicle width direction W in the through-holes 273, 277. In this state, the through-holes 273, 277, that is, the first shaft portion 271 and the second shaft portion 275 are farthest from each other in the front-rear direction L. Accordingly, the first end 272 and the second end 276 are respectively received by the front and rear shaft receiving portions 220. That is, the pivot 241 is coupled to the box main body 210.

Figure 24:
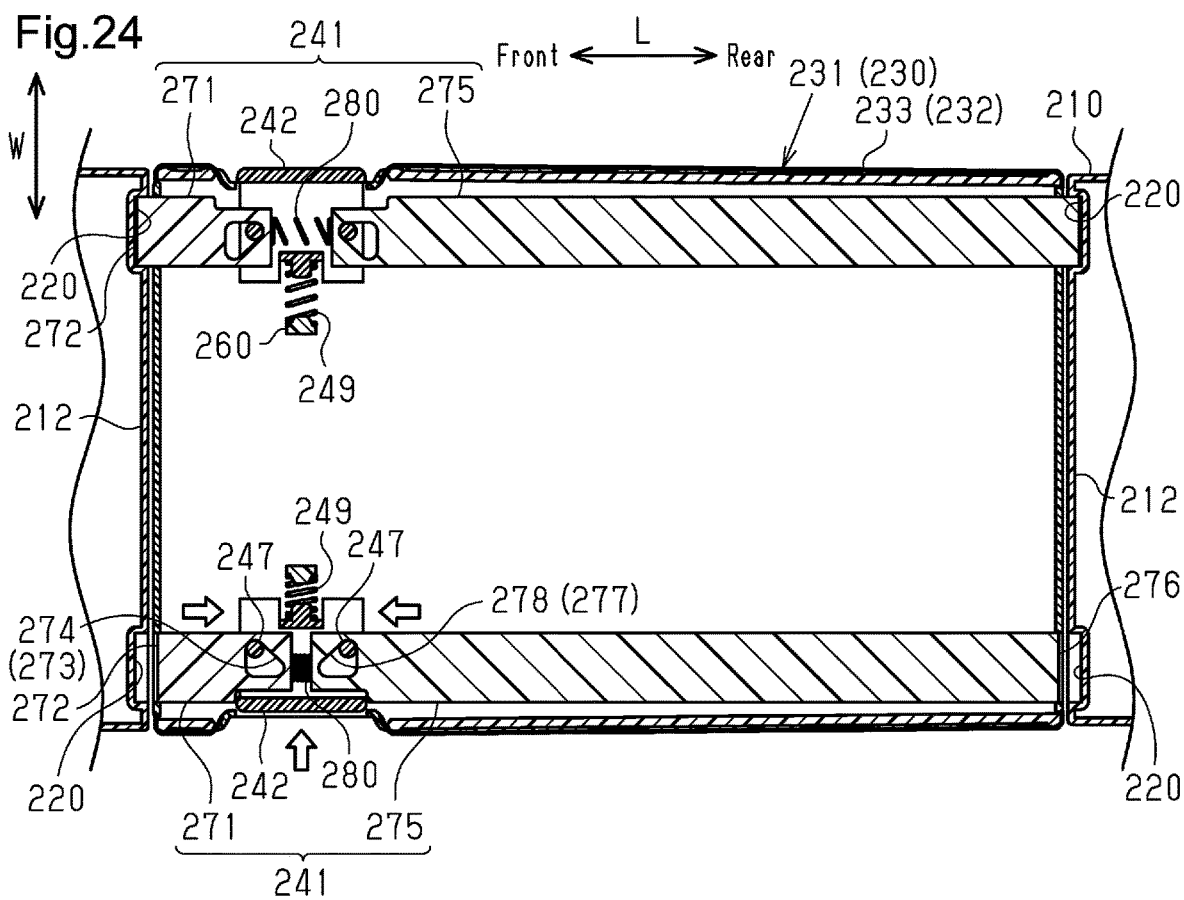
FIG. 24 is a partial cross-sectional view corresponding to FIG. 22, showing the upper portion of the console box in a state in which one of the operation portions is pushed inward.

When the operation portion 242 is pushed inward against the urging force of the first spring 249 as shown in the lower half of FIG. 24, the two pin portions 247 move inward in the vehicle width direction W while pushing the inclined surfaces 274, 278 of the through-hole 273, 277 inward in the vehicle width direction W. At this time, the pin portions 247 move to the innermost positions in the vehicle width direction W in the through-holes 273, 277. This causes the first shaft portion 271 and the second shaft portion 275 to be closest to each other in the front-rear direction L, so that the first end 272 and the second end 276 are respectively dislodged from the front and rear shaft receiving portions 220. This decouples the pivot 241 and the box main body 210 from each other.

The present embodiment has the following advantages.

(3-1) The interlocking mechanism 290 links the operation portion 242 to the first shaft portion 271 and the second shaft portion 275. In conjunction with an inward movement of the operation portion 242 in the vehicle width direction W, the interlocking mechanism 290 moves the first shaft portion 271 and the second shaft portion 275 toward each other.

With this configuration, when the operation portion 242 is pushed inward in the vehicle width direction W, the interlocking mechanism 290 moves the first shaft portion 271 and the second shaft portion 275 toward each other. This dislodges the shaft receiving portions 220 from the first shaft portion 271 and the second shaft portion 275, so that the pivot 241 and the box main body 210 are decoupled from each other. Accordingly, the console box is easily constructed.

<Modifications>

The above-described embodiments may be modified as follows. The above-described embodiments and the following modifications can be combined as long as the combined modifications remain technically consistent with each other.

Figure 10A:
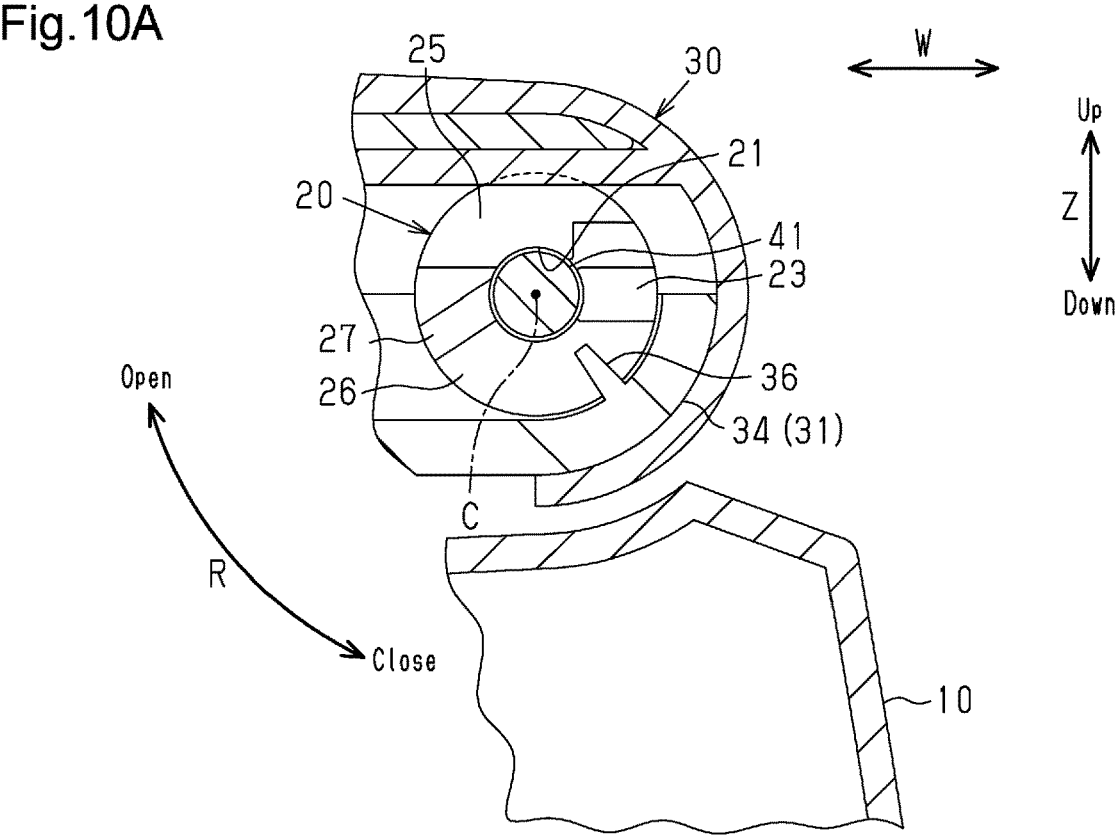
FIG. 10A is a cross-sectional view corresponding to FIG. 7, illustrating a console box according to a modification.
Figure 10B:
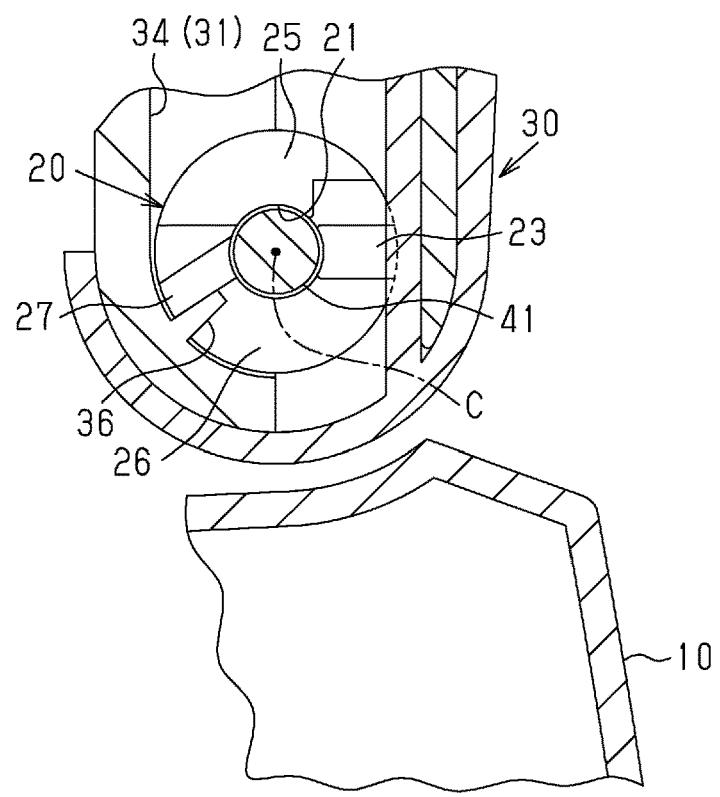
FIG. 10B is a cross-sectional view corresponding to FIG. 10A, illustrating a state in which a lid is open.

It is also possible to employ a console box according to a modification shown in FIGS. 10A and 10B.

As shown in FIG. 10A, the lid main body 31 includes a restricting projection 36 projecting toward the axis C of the pivot 41. The restricting projection 36 is provided on the inner surface of the second half body 34.

An allowance recess 26 is provided in an end face of the shim 20 on the side facing the pivot 41 in the axial direction L. The allowance recess 26 allows the restricting projection 36 to rotate as the lid main body 31 rotates. The allowance recess 26 is located below the axis C.

A direction in which the lid main body 31 pivots about the axis C is referred to as a pivoting direction R. A side in the pivoting direction R that corresponds to the open position of the lid main body 31 is referred to as an opening side.

An opening-side inclined surface 27 is provided on the opening side in the pivoting direction R of the allowance recess 26. The opening-side inclined surface 27 is inclined such that a given point on the opening-side inclined surface 27 approaches the restricting projection 36 in the axial direction L (i.e. toward the viewer of the sheet of FIG. 10A) as that point moves toward the opening side. The opening-side inclined surface 27 overlaps with the restricting projection 36 in the pivoting direction R.

With this configuration, when the lid 30 is opened to a first opening degree (in this case, 90°) or more as shown in FIG. 10B, the opening-side inclined surface 27 provided on the end face of the shim 20 is pressed by the restricting projection 36 provided on the lid main body 31. The opening-side inclined surface 27 is inclined such that a given point on the opening-side inclined surface 27 approaches the restricting projection 36 in the axial direction L as that point moves toward the opening side. Accordingly, the shim 20 moves away from the pivot 41 in the axial direction L (i.e. away from the viewer of the sheet of FIG. 10B) against the urging force of the second spring 29. Then, when the opening degree of the lid 30 is a second opening degree, which is greater than the first opening degree, the pivots 41 are dislodged from the receiving recesses 21 of the shims 20. This decouples the pivots 41 and the box main body 10 from each other. The lid 30 is thus prevented from opening excessively.

In the first embodiment, the lid 30 does not necessarily need to be configured to be detached from the box main body 10 when both of the operation portions 42 are operated simultaneously. For example, the lid 30 may be configured to be detachable in the following manner. After one of the operation portions 42 is operated to decouple the corresponding pivot 41 and the box main body 10 from each other, the pivot 41 corresponding to the other operation portion 42 are operated to decouple the pivot 41 and the box main body 10 from each other.

In the first embodiment, the lifting mechanisms 19 may be omitted.

In each embodiment, two or more recesses 34a may be provided in the second surface 34A, 134A, 234A of the lid main body 31, 131, 231.

In each embodiment, the recess 34a may be omitted from the second surface 34A, 134A, 234A of the lid main body 31, 131, 231. That is, neither the first surface 32A, 132A, 232A nor the second surface 34A, 134A, 234A may have a recess. In this case, for example, the first surface 32A, 132A, 232A and the second surface 34A, 134A, 234A may have different designs.

In each embodiment, the lid main body 31, 131, 231 may have a shape that cannot be attached to the box main body 10, 110, 210 when the second surface 34A, 134A, 234A faces upward.

In each embodiment, the two pivots 41, 141, 241 are provided to be parallel with each other at the opposite sides in the vehicle width direction W. In place of this, two pivots may be provided to be parallel with each other at the opposite sides in the front-rear direction L. In this case, the width direction of the lid main body agrees with the front-rear direction L, and the axial direction of the pivots agrees with the vehicle width direction W.

In the first embodiment or the second embodiment, the operation portions 42, 142 are not limited to ones that are pushed inward in the vehicle width direction W, but may be levers that can be tilted. Further, the operation portions are not limited to ones provided in the lid main body, but may be provided in the box main body. In these cases, a conversion mechanism may be provided that converts an operating force for tilting the operation portion into a force that moves the pivot inward in the vehicle width direction W.

In each embodiment, one of the two pivots may be omitted. That is, the pivot may be provided only on one side in the width direction of the lid main body.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A console box, comprising:
    a box main body including an upper opening; and
    a lid that is pivotally coupled to the box main body, and opens and closes the upper opening, wherein
    the lid includes:
        a lid main body;
        a pivot provided at one side in a width direction of the lid main body, the pivot coupling the lid main body to the box main body; and
        an operation portion provided to correspond to the pivot, the operation portion decoupling the pivot and the box main body from each other when operated, and
    the lid is configured to be pivotal about the pivot and to be detached from the box main body when the operation portion is operated,
    the lid main body includes a first surface and a second surface, which is located on a back side of the first surface, and
    the box main body and the lid have shapes that allow the lid main body to be coupled to the box main body via the pivot regardless of which of the first surface and the second surface is facing upward.

2. The console box according to claim 1, wherein
    the pivot includes two parallel pivots that are provided at opposite sides in the width direction,
    the operation portion includes two operation portions that are independent from each other, the two operation portions respectively corresponding to the two pivots, and
    the lid is configured to be pivotal about a selected one of the pivots and to be detached from the box main body when both of the operation portions are operated.

3. The console box according to claim 1, wherein
    the first surface includes an armrest surface, and
    the second surface includes a tray surface with a recess.

4. The console box according to claim 1, wherein the box main body includes a lifting mechanism that always urges the lid upward.

5. A console box comprising:
    a box main body including an upper opening; and
    a lid that is pivotally coupled to the box main body, and opens and closes the upper opening, wherein the lid includes:
  a lid main body;
  a pivot provided at one side in a width direction of the lid main body, the pivot coupling the lid main body to the box main body; and
  an operation portion provided to correspond to the pivot, the operation portion decoupling the pivot and the box main body from each other when operated, and
  the lid is configured to be pivotal about the pivot and to be detached from the box main body when the operation portion is operated, wherein
the operation portion is configured to move the pivot inward in the width direction by being operated,
the lid includes a first urging member that always urges the operation portion outward in the width direction,
the console box further comprises:
  two shims non-rotatably installed in the box main body, the shims rotatably supporting opposite ends of the pivot; and
  two second urging members that always urge the shims toward the pivot in an axial direction of the pivot,
each shim includes a receiving recess that receives an end, in the axial direction, of the pivot,
each receiving recess includes an inner inclined surface in a section of an inner circumferential surface that is on an inner side in the width direction, the inner inclined surface is inclined such that a given point on the inner inclined surface moves inward in the width direction as that point moves outward in the receiving recess in the axial direction, and
the inner inclined surface is located at a position where the inner inclined surface overlaps with the pivot in the width direction.

6. The console box according to claim 5, wherein
each shim includes an outer peripheral inclined surface in an upper part of an outer circumferential surface, the outer peripheral inclined surface is inclined such that a given point on the outer peripheral inclined surface moves downward as that point moves toward the pivot in the axial direction, and
the outer peripheral inclined surface is located at a position where the outer peripheral inclined surface overlaps with the pivot in an up-down direction.

7. The console box according to claim 5, wherein
the lid main body includes a restricting projection projecting toward an axis of the pivot,
an allowance recess is provided in an end face of each shim on a side facing the pivot in the axial direction, the allowance recess allowing the restricting projection to rotate as the lid main body rotates,
a direction in which the lid main body pivots about the axis is referred to as a pivoting direction, a side in the pivoting direction that corresponds to an open position of the lid main body being referred to as an opening side,
an opening-side inclined surface is provided on the opening side in the pivoting direction of the allowance recess,
the opening-side inclined surface is inclined such that a given point on the opening-side inclined surface approaches the restricting projection in the axial direction as that point moves toward the opening side, and
the opening-side inclined surface overlaps with the restricting projection in the pivoting direction.

8. The console box according to claim 5, wherein
the pivot is formed separately from the operation portion,
the pivot includes two pinions at opposite ends, and
the lid main body includes two racks that mesh with the pinions and support the pinions such that the pinions are rotatable and movable in the width direction.

9. A console box comprising:
a box main body including an upper opening; and
a lid that is pivotally coupled to the box main body, and opens and closes the upper opening, wherein
the lid includes:
  a lid main body;
  a pivot provided at one side in a width direction of the lid main body, the pivot coupling the lid main body to the box main body; and
  an operation portion provided to correspond to the pivot, the operation portion decoupling the pivot and the box main body from each other when operated, and
the lid is configured to be pivotal about the pivot and to be detached from the box main body when the operation portion is operated, wherein
the pivot includes a first shaft portion that includes a first end of the pivot, and a second shaft portion that includes a second end on a side opposite to the first end of the pivot,
the operation portion is formed separately from the first shaft portion and the second shaft portion, the operation portion is located between the first shaft portion and the second shaft portion, the operation portion is configured to be operated by being pushed inward in the width direction with respect to the lid main body,
the box main body includes two shaft receiving portions, the two shaft receiving portions respectively receive the first end and the second end and rotatably support the first end and the second end, and
the lid includes:
  a first urging member that always urges the operation portion outward in the width direction;
  a shaft portion urging member that is provided between the first shaft portion and the second shaft portion to urge the first shaft portion and the second shaft portion away from each other; and
  an interlocking mechanism that links the operation portion to the first shaft portion and the second shaft portion, wherein, in conjunction with an inward movement of the operation portion in the width direction, the interlocking mechanism moves the first shaft portion and the second shaft portion toward each other.

10. The console box according to claim 1, wherein
the console box further comprises two shims installed in the box main body,
each of the two shims includes a receiving recess,
the receiving recesses of the two shims are configured to receive opposite ends of the pivot so as to couple the lid main body to the box main body, and
the box main body and the lid have shapes that allow the opposite ends of the pivot to be received in the receiving recesses of the two shims regardless of which of the first surface and the second surface is facing upward.

* * * * *